(12) United States Patent
Kothari et al.

(10) Patent No.: US 6,339,840 B1
(45) Date of Patent: *Jan. 15, 2002

(54) APPARATUS AND METHOD FOR PARALLELIZING LEGACY COMPUTER CODE

(75) Inventors: Suraj C. Kothari; Mitra Simanta; Youngtae Kim, all of Ames, IA (US)

(73) Assignee: Iowa State University Research Foundation, Inc., Ames, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,079

(22) Filed: Jun. 2, 1997

(51) Int. Cl.[7] .............................................. G06F 15/16
(52) U.S. Cl. ......................................................... 717/6
(58) Field of Search ............................... 395/706; 717/6

(56) References Cited

U.S. PATENT DOCUMENTS

| | | | |
|---|---|---|---|
| 5,347,639 A | * 9/1994 | Rechtschaffen et al. | .... 395/379 |
| 5,412,784 A | * 5/1995 | Rechtschaffen et al. | .... 395/595 |
| 5,857,180 A | * 1/1999 | Hallmark et al. | ............... 707/2 |

OTHER PUBLICATIONS

Kothari, S.C., et al., "1998 Progress Report: Parallelization Agent for Legacy Codes in Environmental Modeling", National Center for Environmental Research and Quality Assurrance http:///es/epa.gov/ncerqa/progress/kothari98.html, 1–3 p., (1998).

(List continued on next page.)

*Primary Examiner*—Mark R Powell
*Assistant Examiner*—John Q. Chavis
(74) *Attorney, Agent, or Firm*—Schwegman, Lundberg, Woessner & Kluth, P.A.

(57) ABSTRACT

A computer-implemented method and apparatus for parallelizing input computer-program code based on class-specific abstractions. The method includes the steps of providing a class-specific abstraction (CSA), and generating parallelization code based on the CSA and the input code. Other aspects include checking the input code for compliance with the CSA, performing a dependency analysis of the input code for compliance with the CSA, analyzing the control flow of the input code based on the CSA, and generating a block-based representation of a control flow based on index variables in the input code and on the CSA. In one embodiment, the CSA includes a computational-set template, a dependency template, and a set of allowed index-variable access patterns. Yet other aspects include generating synchronization points based on the CSA, mapping a computational set to a virtual array of parallel processors, and mapping the virtual array of parallel processors to a physical array of parallel processors. Other features include outputting a representation of communications flow between processors of data related to index variables in the input code. Other aspects include a storage medium having a computer program stored thereon for causing a computer to parallelize input code by the method. Another embodiment includes the steps of identifying to the computer a numerical-method class used in the input code, identifying a mapping of an index variable used in the input code to spatial coordinates. Other aspects include performing dependency analysis to determine communication-synchronization points, and minimizing the number of such points for data transmitted between processors.

32 Claims, 9 Drawing Sheets

OTHER PUBLICATIONS

Kothari, SC., et al., "Parallelization Agent for Atmospheric Models", *Proceedings of the Symposium on Regional Weather Prediction on Parallel Computer Environments,* SKIRON , University of Athens, Greece, 1–10 p., Oct. 1997).

Ahmad, I., et al., "Automatic Parallelization and Scheduling of Programs on Multiprocessors using CASCH", *IEEE Publication,* No. 0190–3918/97, pp. 288–281, (1997).

Banerjee, U., et al., "Automatic Program Parallelization", *Proceedings of the IEEE, 81,* pp. 211–243, (Feb. 1993)

Beletsky, V., et al., "A Package for Automatic Parallelization of Serial C–Programs for Distributed Systems", *IEEE Publication,* No. 0–816–7177, pp. 184–188, (Jul. 1995).

Di Martino, B., et al., "Towards Automated Code Parallelization through Program Comprehension", *IEEE Publication,* No. 0–8186–5647, pp. 108–115, (Jun. 1994).

Huelsbergen, L., et al., "Dynamic Program Parallelization", *ACM Publication,* No. 0–89791–483, pp. 311–323, (1992).

Bebler, C.W., et al., "Pattern–Driven Automatic Program Transformation and Parallelization", *IEEE Publication,* No. 1066–6192, pp. 76–83, (1995).

Watts, T.M., et al., "Techniques for Integrating Parallelizing Transformations and Compiler Based Scheduling Methods", *IEEE Publciation,* No. 1063–9535, pp. 830–839, (1992).

Yang, J.A., et al., "Parallel–Program Transformation Using a Metalanguage", *ACM Publication,* No. 0–897910–390–6, pp. 11–20, (Jun. 1991).

Massingill, B., "Mesh Computations", *Tech Report, CalTech Technical Report,* 1–35, (1995).

Messina, P., et al., "System Software and Tools for High Performance Computing Environments", *SIAM Publication, Philadelphia (table of contents only*), 1–9, (1993).

Skillicorn, D.B., "Architecture–Independent Parallel Computation", *IEEE Computer, 28,* 38–51, (1990).

Snyder, L., "A Practical Parallel Programming Model", *DIMACS, 18,* 143–160, (1994).

Valiant, L.G., "A Bridging Model for Parallel Computation", *Communications of ACM, 8,* 103–111, (1990).

Williams, R.D., "DIME: A Programming Environment for Unstructured Triangular Meshes on a Distributed–Memory Parallel Processor", *The Third Conference on Hypercube Concurrent Computers and Applications,* vol. 2, 1770–1787, (1988).

Ahmed, S., et al., "The Linda Program Builder", *3rd Workshop Languages and Compilers for Parallelism,* MIT Press, 1–18, (1991).

Anderson, J.M., et al., "Global Optimizations for Parallelism and Locality on Scalable Parallel Machines", *ACM SIGPLAN Notices, 28,* 112–125, (1993).

Anthes, R.A., et al., "Development of Hydrodynamic Models Suitable for Air Pollution and Other Mesometeorlogical Studies", *Monthly Weather Review, 106,* 1045–1078, (1978).

Banatre, J., et al., "The Gamma Model and Its Discipline of Programming", *Sci. of Computer Programming, 15,* 55–77, (1990).

Bodin, F., et al., "Sage ++: An Object–Oriented Toolkit and Class Library for Building Fortran and C++Restructuring Tools", *Tech. Report,* Dept. of Computer Science, Indiana University, 1–16, (1993).

Cheng, D.Y., "A Survey of Parallel Programing Tools", *Tech. Report RND–91–005,* NASA Ames Research Center, Moffet Field, CA 94035, 1–70, (1993).

Dongorra, J.J., et al., "Environments and Tools for Parallel Scientific Computing", *Advances in Parallel Computing, 6 (table of contents only),* I–XVI, (1993).

Friedman, R., et al., "Fortran Parallelization Handbook", Preliminary Edition, Applied Parallel Research, Sacramento, CA, 1–86 (1995).

Goldberg, A., et al., "Specification and Development of Parallel Algorithms with the Proteus System", *DIMACS, 18,* 383–399, (1994).

Hiranandani, S., et al., "The D Editor: A New Interactive Parallel Programming Tool", Proceedings of Supercomputing Conference, Washington, DC Nov. 14–18, 1994, 733–742, (1994).

Li, J., et al., "The Data Alignment Phase in Compiling Programs for Distributed–Memory Machines", *J. of Parallel and Distributed Computing, 13,* 213–221, (1991).

Luksch, P., Software Engineering Methods for Debugging Parallel and Distributed Applications . . . , IEEE, p.491–500, Jan 1, 1997.*

Ajwa et al., Applying Parallel Disbtributed Computing to Advanced Algebraic Computations, IEEE, p.156–164, 1997.*

Subramonian, Writing Sequential Programs for Parallel Processors . . . , IEEE, p. 159–163, 1992.*

Derra, S., "Breaking the Code", *Inside Iowa State,* 2 p., (Mar. 21, 1997).

Kothari, S.C., et al., "Optimal Designs of Linear Flow Systolic Architectures", *Proceedings of the International Conference on Parallel Processing, vol. I Architecture,* Pennsylvania State University Press, University Park, Pennsylvania, pp. 247–256, (Aug. 8–12, 1989).

Kothari, S.D., et al., "Parallelization Agent for Legacy Codes in Environmental Modeling", *Application for Federal Assistance,* 33 p., (Mar. 13, 1996).

Mitra, S., "A Class–base Approach to Parallelization of Legacy Codes", *Iowa State University Dissertation,* Ames, IA, 1–50 p., (1997).

* cited by examiner

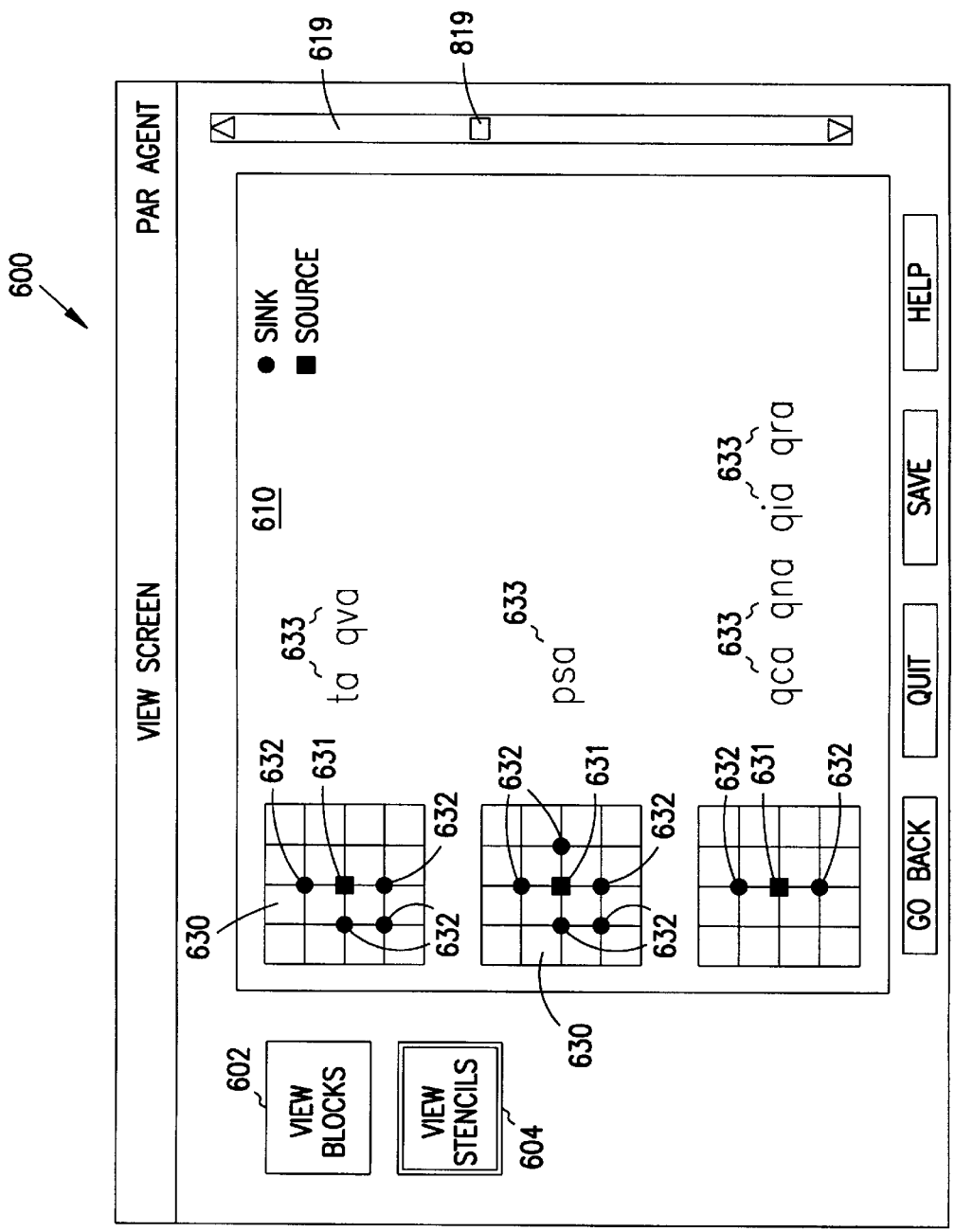
FIG. 8.1

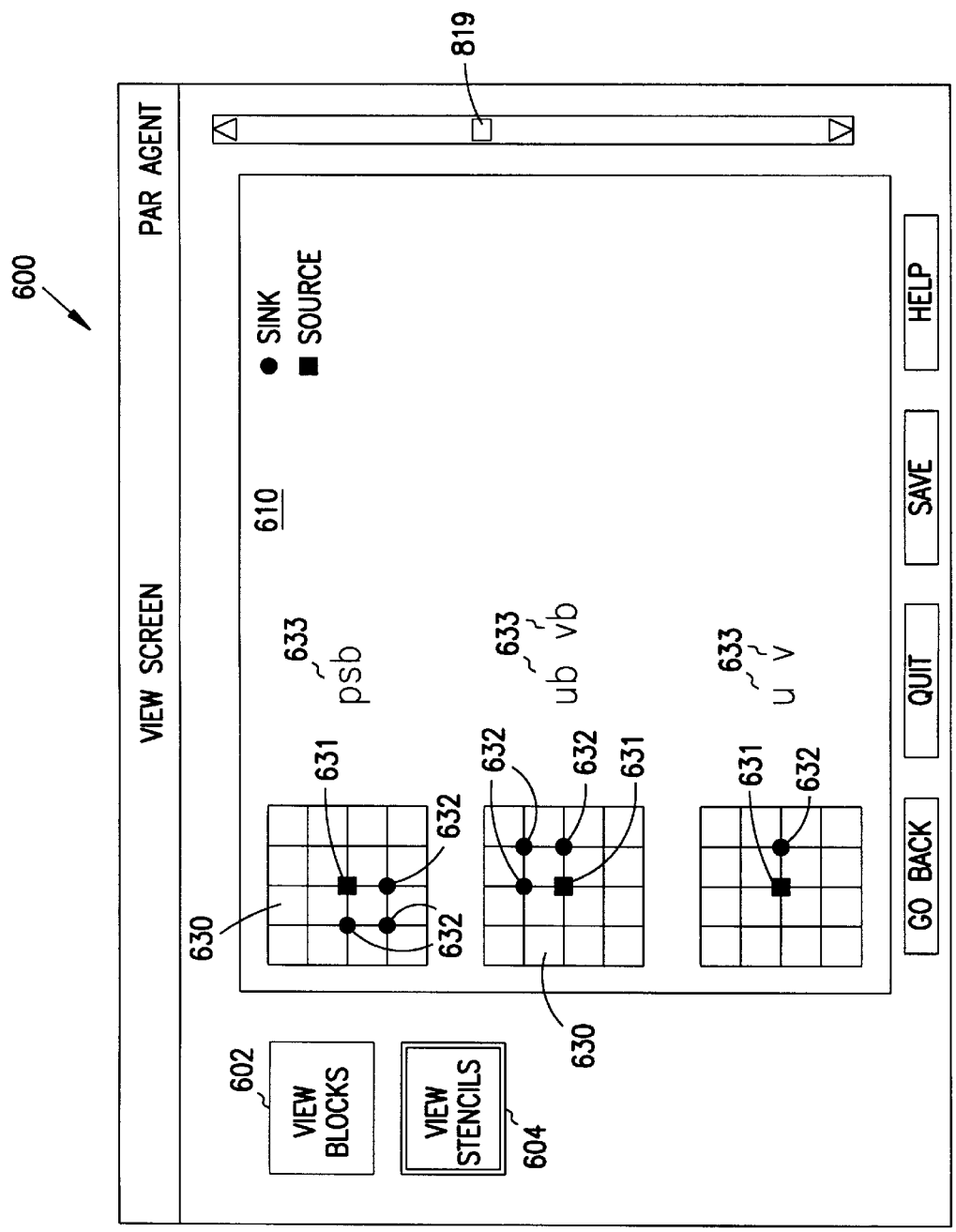
FIG. 8.2

APPARATUS AND METHOD FOR PARALLELIZING LEGACY COMPUTER CODE

STATEMENT AS TO RIGHTS TO INVENTIONS MADE UNDER FEDERALLY SPONSORED RESEARCH AND DEVELOPMENT

Portions of the present invention were made with the support of the United States Government via a grant from the United States Environmental Protection Agency (EPA) under grant R 82 52 06. The U.S. Government has certain rights in the invention.

FIELD OF THE INVENTION

This invention relates to the field of computer programs that generate computer code, and more specifically to a method and apparatus of generating code that better utilizes distributed-memory parallel computers to execute programs, particularly pre-existing programs that were written to run on sequential computers.

BACKGROUND OF THE INVENTION

Over the years, scientists and engineers have built a large software base of numerical modeling codes for scientific computing. These legacy codes, are very valuable because of the solid pedigree associated with them. (Since they have been run and checked for accuracy many times by many different users, most of the errors have been found and removed.) The term "legacy code" as used herein refers generally to existing computer programs, and particularly to such programs (i.e., code) which were programmed some time ago. Typically, the programmers who worked on such code are no longer available, or have forgotten much of the reasoning used to generate the code. Legacy code is particularly valuable when it solves large and complex problems (for example, weather-forecasting models), and when much time and effort was spent to generate it. It is prohibitively expensive to recreate solutions from scratch to such problems in languages designed for distributed-memory parallel systems that are available today. In particular, it is very difficult and expensive to verify that such new programming exactly duplicates the operation and results of the legacy codes. The physics, mathematics, and numerical methods used together in large legacy code create a complexity which makes automatic parallelization difficult. Therefore, in the past, such code was manually converted by human programmers who examined the code, manually tracked the use of variables, and inserted changes to facilitate parallelization. Such manual conversion is tedious, time consuming (and thus expensive), and error prone (such manual processes could be compared to manually solving numerical problems that include very large numbers of manual calculations). The errors that occur in such manual conversion processes are particularly problematic since the errors propagate (and thus evidence of the error tends to be quite separated from the source of the error), and it is very difficult to track down the source of the error.

Difficulties in manual parallelization point to a need for automation. Several automatic and semi-automatic tools have been developed {J. J. Dongorra and B. Tourancheau, *Environments and tools for parallel scientific computing*, Advances in Parallel Computing, 6 (1993); [18]}. Doreen Cheng has published an extensive survey {Cheng, *A survey of parallel programming languages and tools*, Tech. Rep. RND-93-005, NASA Ames Research Center, Moffet Field, Calif. 94035, 1993} with 94 entries for parallel programming tools, out of which nine are identified as "parallelization tools to assist in converting a sequential program to a parallel program." In spite of considerable efforts, attempts to develop fully automatic parallelization tools have not succeeded. Several years of research suggest that fill automation of the parallelization process is an intractable problem. Consequently, the emphasis of recent research has been on developing interactive tools requiring assistance from the user. Interactive D-editor {S. Hiranandani, K. Kennedy, C.-W. Tseng, and S. Warren, The d editor: *A new interactive parallel programming tool*, in Proceedings of Supercomputing Conference, 1994, pp. 733–7421} and Forge {R. Friedman, J. Levesque, and G. Wagenbreth, *Fortran Parallelization Handbook*, Applied Parallel Research, 1995} are examples of the state-of-the-art interactive parallelization tools. However, they too have a number of weaknesses and limitations when it comes to parallelizing legacy codes.

There is thus a need for an automatic method and apparatus that converts these legacy codes and other programs (such as those that were initially written to be run on a uniprocessor) into a form that allows the efficient use of modem distributed-memory parallel computers and/or networks of computers to run these computer programs.

SUMMARY OF THE INVENTION

The present invention provides a computer-implemented method and apparatus for parallelizing input computer-program code (the "input code") based on class-specific abstractions. The method includes the steps of providing a class-specific abstraction (CSA) of an underlying numerical method used in the input code, and generating parallelization code based on the CSA and the input code. Other aspects include checking the input code for compliance with the CSA, performing a dependency analysis of the input code for compliance with the CSA, analyzing the control flow of the input code based on the CSA, and generating a block-based representation of a control flow based on index variables in the input code and on the CSA. In one embodiment, the CSA includes a computational-set template, a dependency template, and a set of allowed index-variable access patterns. Yet other aspects include generating synchronization points based on the CSA, mapping a computational set to a virtual array of parallel processors, and mapping the virtual array of parallel processors to a physical array of parallel processors. Other features include outputting a representation of communications flow between processors of data related to index variables in the input code. Another embodiment includes the steps of identifying to the computer a numerical-method class used in the input code, and identifying a mapping of an index variable used in the input code to spatial coordinates. Other aspects include performing dependency analysis to determine communication-synchronization points, and minimizing the number of such points for data transmitted between processors.

Other aspects include a storage medium having a computer program stored thereon for causing a computer to parallelize input code by a method of the present invention.

Another embodiment of the present invention includes a computerized system for class-specific parallelizing of input computer-program code. The system includes a computer, receivers in the computer that receive input identifying to the computer a numerical-method class used in the input code and input identifying to the computer one or more index variables in the input code are associated with spatial coordinates of the numerical-method-class. The system also includes a synchronization-point generator in the computer that generates synchronization points for the input code based on the numerical-method class and the index variables, and a mapper in the computer that generates a global-to-local index variable mapping based on the numerical-method class and the index variables.

Yet another aspect of the present invention provides apparatus and a method that includes the steps of: identifying to the computer a numerical-method class used in the input code, identifying to the computer a mapping of a numerical-method-class space into a variable used in the input code, generating in the computer synchronization points for the input code based on the numerical-method class and the mapping, and generating in the computer a local array variable conversion based on the numerical-method class and the mapping. Other aspects of the present invention include generating in the computer a block-based representation of the control flow based on the index variable, performing in the computer dependency analysis to determine communication-synchronization points, and minimizing in the computer the number of communication-synchronization points for data transmitted between processors. Yet other aspects of the present invention include mapping in the computer an array space to a virtual array of parallel processors, and mapping in the computer the virtual array of parallel processors to a physical array of parallel processors.

Still other aspects of the present invention include selectively turning off one or more subroutine calls related to the index variable, and outputting a representation of communications flow between processors of data related to the index variable. The present invention also includes providing to the computer a computational-set template of allowed types of computations related to the index variable, and providing to the computer a dependency template of allowed types of dependencies related to the index variable.

BRIEF DESCRIPTION OF THE DRAWINGS

FIGS. 8.1 and 8.2 are screenshots of source-sink data-flow diagrams illustrating one embodiment of parallelization agent 150.

DESCRIPTION OF PREFERRED EMBODIMENTS

Figure 1:
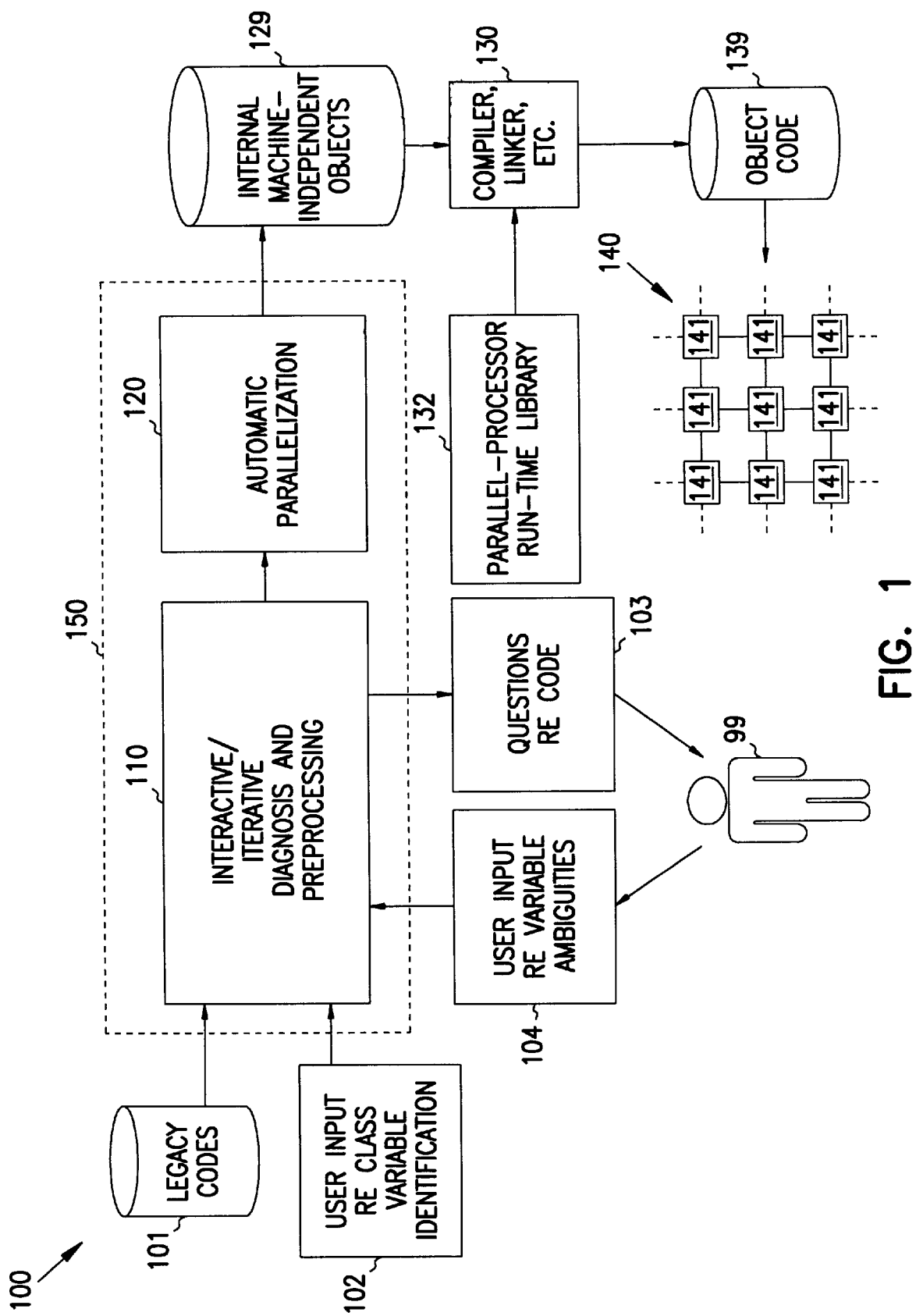
FIG. 1 shows one embodiment of parallelization system 100 including parallelization agent 150.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

One tenet of the present invention is to automatically detect data communication between processors and to minimize the number of synchronization points in order to minimize interprocessor-communications overhead. Another tenet is that certain information about legacy codes is most efficiently handled, tracked, and converted by the parallelization agent (PA) 150, while it is more efficient for other information to be derived by a human programmer analyst and provided to the parallelization agent 150 system. Yet another tenet is that many computer-program codes are based on numerical methods which fall into classes. A class-specific abstraction (CSA) of each class can be derived, and then used to drive a parallelization of computer-program code based on that class.

One embodiment of the present invention uses a pre-derived CSA (that includes computational set rules, dependency rules, and index-variable access-pattern rules) to analyze and process input code and to generate parallelization A changes for the input code. The method is divided into two stages, namely a preprocessing stage that uses interactive input from a user to help analyze the input code, and an automatic stage that uses the CSA and the output of the preprocessing stage to automatically generate communications-synchronization primitives and a global-to-local index-variable mapping.

Approaches to parallelization used by others have specified a mapping of arrays to processors in a parallel processor as the basis for parallelization. In such systems, the processor that ends up with a particular element of an array will be responsible for the computations using that element. In contrast, one embodiment of the present invention instead starts by mapping a computational set (wherein each computation is specified by a set of index variables) to a virtual array of processors. The computational-set mapping then determines the mapping of array elements to each processor (the array elements needed for a computation are then mapped to the processor responsible for that computation; for example, if a matrix-multiply computation were said to be indexed by index variables I, J, K and was based on array elements $C(I,J)+A(I,K)*B(K,J)$, and the computation$(I,J,K)$ were mapped to virtual processor$(I,J)$, then the respective array elements needed are to be mapped to that processor). Once a suitable mapping from the computational set to the virtual array of processors is determined, then the virtual array of processors is then mapped to a real array of processors. The computation-to-processor mapping may leave some processors with more computations than other processors.

FIG. 1 shows one embodiment of the present invention (parallelization system 100) having a parallelization agent 150. Input code 101 (computer programs such as legacy codes) are provided as input to diagnosis and preprocessing program 110 that interactively and/or iteratively processes input code 101 according to initial input 102 from a user 99 that identifies the class of code and identifies index variables that are associated with spatial coordinates. In one embodiment, the user 99 is presented with a menu-driven series of questions by the system 100 to guide the input of initial input 102 (i.e., the system 100 provides a menu-driven interface to guide the user 99 during this phase). Diagnosis and preprocessing program 110 will output questions 103 for further information it needs or other problems it encounters (e.g., a list of line numbers and the variables associated with each of those line numbers for which it needs further information, typically information to resolve ambiguities relating variables in input code 101 to spatial coordinates). The user 99 will then provide user input 104 (e.g., specifying, for each line number called out in output questions 104, which indices of an array variable correspond to which coordinates of the physical system being modeled) to diagnosis and preprocessing program 110. In one embodiment, this second iteration of user input 104 (giving all variable information for all line numbers listed in questions 103) provides all information necessary to complete the preprocessing of input code 101. In another embodiment, an interactive user interface is provided, wherein the user 99 is presented questions 103 one at a time, and asked to provide the corresponding answers 104 as the process proceeds. In yet other embodiments, questions 103 are interactively posed along with system-suggested answers derived from previous inputs 102 and 104 and system analysis of input code 101, and the user 99 confirms or corrects these answers as input 104. Preprocessed code 119 from the preprocessing stage 110 is then passed to automatic parallelization stage 120, in which synchronization points are inserted, global-array variables are converted to local-array variables, and data trajectory information is automatically derived by PA 150 and used to generate data-communication controls. The automatic parallelization stage 120 outputs one or more internal machine-independent objects 129, which are passed to compiler/linker 130 along with a parallel-processor run-time system library (RSL) 132 to be compiled and linked into object code 139. It is object code 139 which is run on parallel-processor system 140. Parallel processor 140 is any suitable parallel processor such as a massively parallel supercomputer (e.g., a Cray T3E system or an IBM SP2 system), or a cluster of networked workstations (e.g., a plurality of IBM RS6000 computers connected by a high-speed local-area network).

In one embodiment (e.g., finite difference method, or "FDM" codes), PA 150 maps 3D sets of computations to a 2D array of virtual processors, such that, for example every set of computations has its (2,3,5) computation mapped to processor (2,3), and each set of computations' (I,J,K) computation/element is mapped to processor (I,J). Each computation set (there will be one or more computation set associated with a class) has at least one computation, generally in a loop control structure, associated with an ordered multiple index variable set associated with spatial coordinates of the class. Each computation is indexed by the indices for the spatial coordinates, for example, an FDM-class code could use I, J, and K as index variables associated with the spatial coordinates, and thus would index each computation by the ordered triple (I,J,K), and map each of those computations to processor (I,J). Then each virtual processor is later mapped to a real processor, wherein the array of real processors corresponds to the real configuration of parallel processor 140. In such an embodiment, a virtual array of processors having dimensions I and J is needed, but the real array can be of any dimension (but will generally be a rectangular 2D array of, say, dimensions M,N). In another embodiment, each array's (I,J,K) element is mapped to a real processor (I,J), and in such an embodiment, a real array of processors having dimensions I and J is needed. In yet another embodiment, each array's (I,J,K) element is mapped to a real processor (M,N) where M and N are different than I and J (thus merging the mapping to virtual and the subsequent mapping to real of the first above embodiment), and in such an embodiment, a real array of processors having dimensions N and M is needed.

For example, if a matrix-multiply computation were said to be indexed by index variables I, J, K and was based on array elements C(I,J)+A(I,K)*B(K,J), and the computation (I,J,K) were mapped to virtual processor(I,J), then the respective array elements needed are to be mapped to that processor. As another example, a convolution computation set could be indexed by the ordered pair (I,J) wherein each calculation is based on array elements C(I), A(J), and B(I-J).

In one embodiment, the mapping of computations to processors involves two functions called "place" and "step." The place function determines the processor in which the computation takes place, and the step function determines constraints as to the order which must be maintained in performing calculations. Unlike other systems which maintain the original order of computation as specified in the legacy input code 101, the present invention provides a separate step function that determines dependencies for calculations, and thus allows for certain re-ordering of computations within each processor, once the place function has determined a location for the computation. For example, if an algorithm specified 100 computations in DO I=1,100, and the place function mapped computations 1, 11, 21, 31, 41, etc., to processor (1,1), and computations 2, 12, 22, 32, 42, etc., to processor (1,2), but the computations 1, 2, 3, etc. all accessed the same data (which could otherwise require the broadcasting of the elements 1, 2, 3, etc., to all processors for the first computation of each processor), the step function could determine whether the computations in each processor could be re-ordered to eliminate the need to broadcast the data and instead provide a more efficient communications pattern.

The dependency rules thus prescribe what ordering must be respected and maintained. The step function then determines an optimal ordering of computations that respects the dependency rules. Thus, the indexed computations are broken into small rectangular prisms or cubicals each of which is assigned to a particular processor in the system. Within the constraints of the dependency rules, the order of computations is optimized. In general, this approach works well for programs having array dimensions that exceed the number of processors in parallel processor 140, which is the typical case. Both the place function and the step function must be compatible with the dependency rules in the dependency template.

In one embodiment, the internal machine-independent objects 129 generated by parallelization agent 150 includes FORTRAN-language programs derived from FORTRAN-language input code 101 plus the FORTRAN-language parallelization conversion code added by parallelization agent 150. In that embodiment, compiler/linker 130 includes a FORTRAN-language compiler. RSL 132 is a library of run-time code that is designed for a specific parallel processor 140 (i.e., RSL 132 will be different for an IBM parallel processor 140 than for an SGI parallel processor, due to different architectures, but all RSL's 132 support a common set of machine-independent objects 129). In another embodiment, parallelization agent 150 also includes a compiler suited for the language of input code 101 (for example, one embodiment includes a FORTRAN-language compiler in one parallelization agent 150, and a C-language compiler in another parallelization agent 150), and the set of internal machine-independent objects 129 generated is a compiler-independent, machine-independent internal language representation of the parallelized input code 101. In such an embodiment, compiler/linker 130 and RSL 132 are common across the various front-end language processors and parallelization agents. In one such embodiment, preprocessor 110 includes the compiler function, such that preprocessed code 119 is also common across various computer languages (i.e., language-independent), and likewise the automatic parallelization stage 120 is also common.

The functions of automatic parallelization stage 120 is to make two types of changes: to insert communications primitives, and change global array variables into local array variables. For example, if the program specifies a FOR-loop that goes from 1 to 100 (the global variable), the local variable used by each of ten processors would go from 1 to 10.

Figure 2:
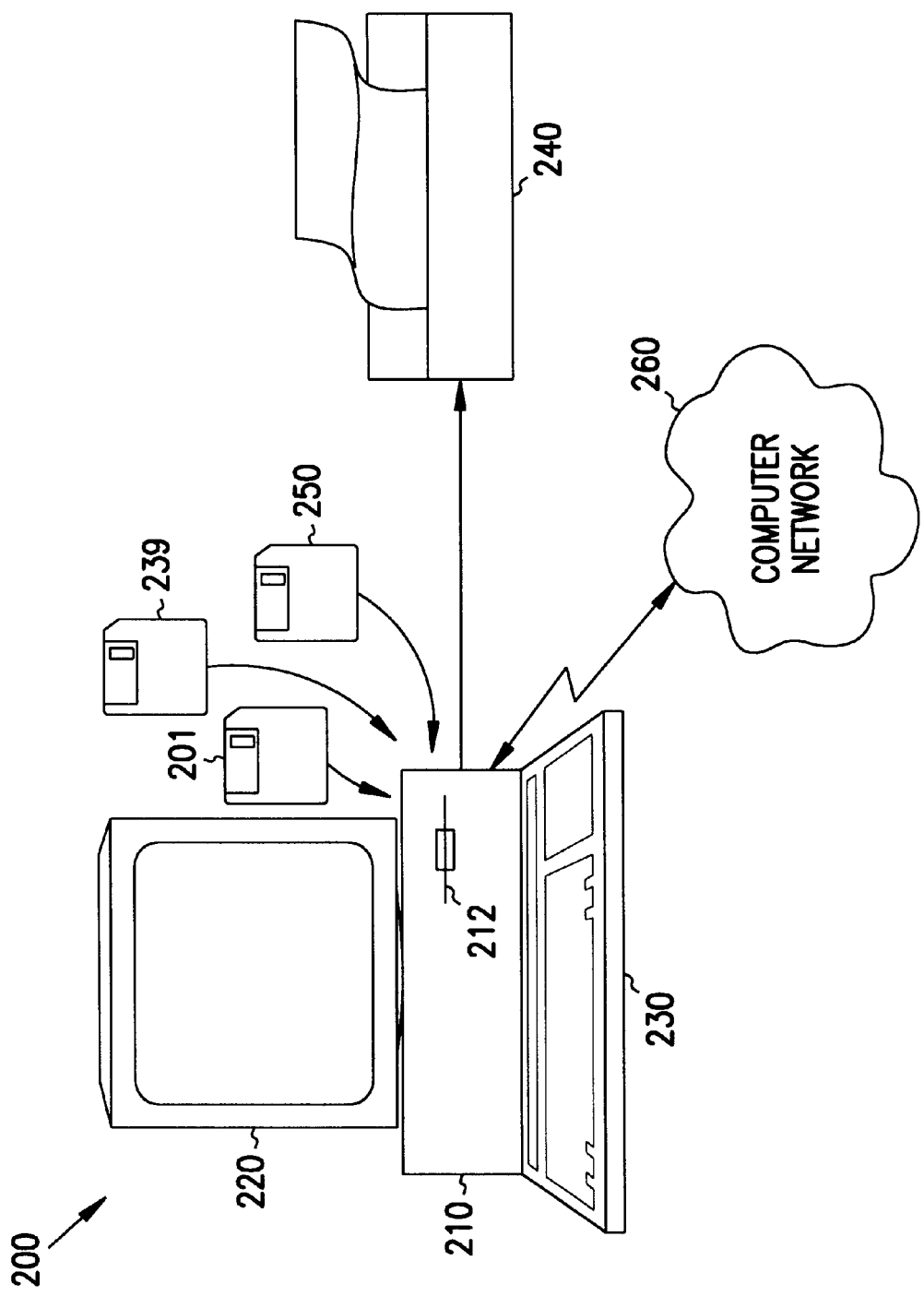
FIG. 2 shows one embodiment of workstation 200 which is used to execute parallelization system 100 shown in FIG. 1.

FIG. 2 is a view showing workstation 200 of one embodiment which is used to execute the parallelization system 100 shown in FIG. 1. In one embodiment, workstation 200 includes computer 210 (in one such embodiment, any suitable scientific-workstation-class computer such as made by SUN Microsystems, Digital Equipment Corporation (DEC), or Silicon Graphics, Incorporated (SGI); in another such embodiment, a high-performance personal computer such as an IBM-compatible computer running on a Pentium-brand microprocessor), display monitor 220, keyboard input device 230, and printer 240. In one embodiment, computer 210 uses a LINUX operating system (a UNIX-like operating system). In one embodiment, computer 210 includes removable-media drive 212 (such as a floppy-disk drive, and/or a ZIP-type or a JAZ-type high-capacity drive available from IOMEGA Corporation of Roy, Utah). In one embodiment, removable-media drive 212 is used to read input code 101 from input media 201, to read parallelization agent program 150 from program media 250, and to write object code 139 onto output media 239. (Media 201, 239, and 250 are suitable for a corresponding removable media drive 212.) In that embodiment, program media 250 is used to distribute parallelization agent program 150 to customers. In another embodiment, computer 210 is connected to computer network 260 (such as a local-area network (LAN), or a wide-area network such as the internet). In such a network environment, one or more of: input code 101, parallelization agent program 150, and/or object code 139 are read from or written to computer network 260. In one such embodiment, computer network 260 is used to distribute parallelization agent program 150 to customers. In one such embodiment, parallel processor 140 is coupled to (and/or part of) computer network 260, so that the parallelized code (129 or 139) may be communicated to parallel processor 140 to be run. In one embodiment, printer 240 provides a printout of questions 103. In another embodiment, display 220 is used to display questions 103.

Figure 3:
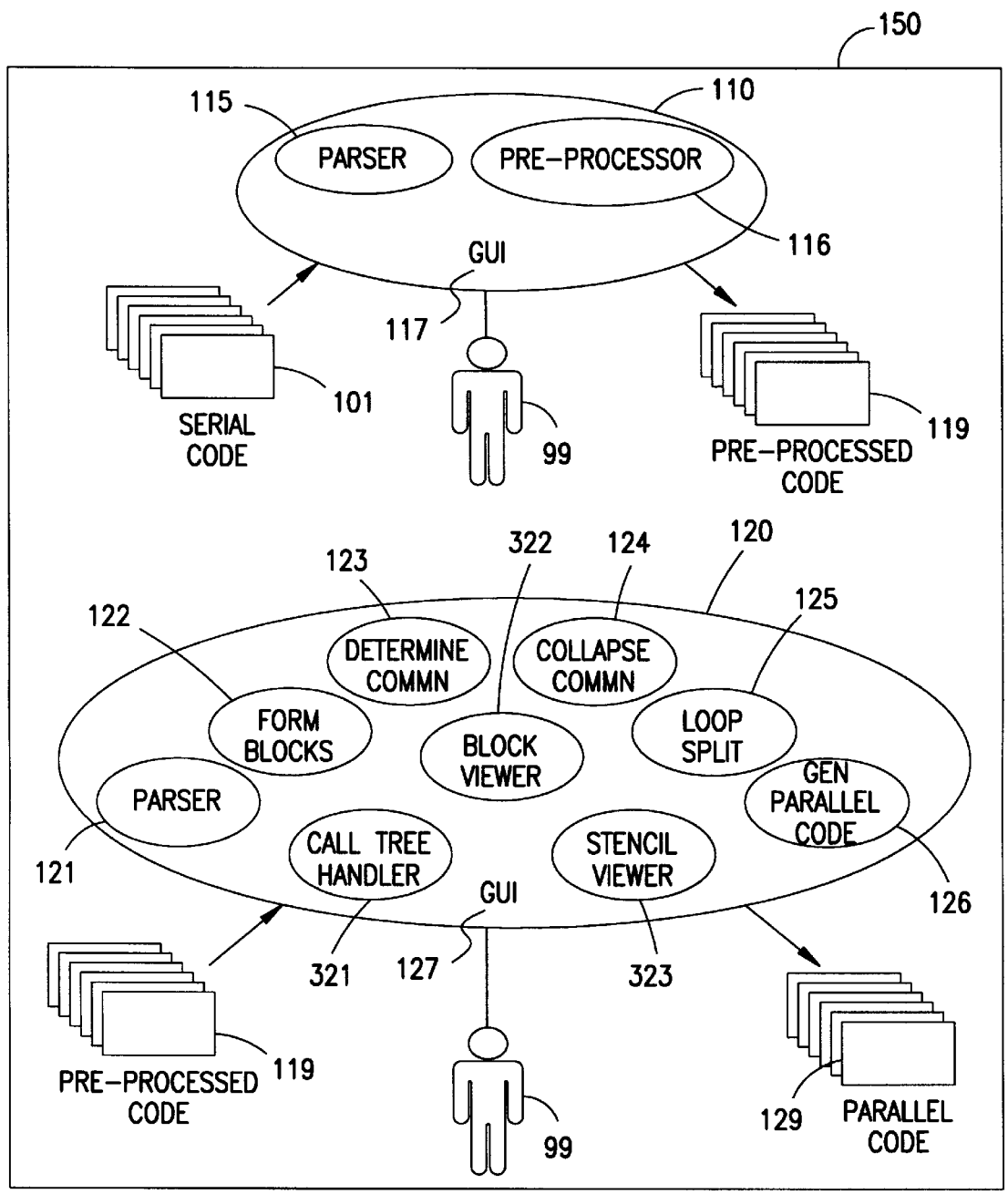
FIG. 3 shows one embodiment of parallelization agent 150.

FIG. 3 shows one embodiment of parallelization agent 150. Diagnosis and preprocessing program 110 includes parser 115, preprocessor 116, and graphical user interface (GUI) 117. As in FIG. 1, serial-type input code 101 is input to diagnosis and preprocessing program 110, and preprocessed code 119 is output. In one embodiment, parser 115 is a language-dependent parser (such as a FORTRAN-language parser or a C-language parser). In one such embodiment, a plurality of specific language-dependent parsers 115 are available within a preprocessing program 110 in order to handle a plurality of languages, while allowing use of common code for the rest of preprocessing program 110. In one embodiment, preprocessed code 119 includes the original input code 101 (e.g., FORTRAN program code), plus a language-independent, machine-independent block structure representing the control flow of the user-specified index coordinates associates with the spatial coordinates of the class.

In one embodiment, automatic parallelization stage program 120 includes parser 121, block former 122, communications determiner 123, communications collapser 124, loop splitter 125, general parallel code converter 126, and graphical user interface (GUI) 127. In one such embodiment, automatic parallelization stage program 120 also includes call-tree handler 321, block viewer 322, and stencil viewer 323. As in FIG. 1, preprocessed code 119 is input to automatic parallelization stage 120, and internal machine-independent objects 129 (parallelized code) is output. In one embodiment, parser 125 is a language-dependent parser (such as a FORTRAN-language parser or a C-language parser). In one such embodiment, a plurality of specific language-dependent parsers 125 are available within an automatic parallelization stage program 120 in order to handle a plurality of languages, while allowing use of common code for the rest of automatic parallelization stage program 120. In one embodiment, machine-independent code 129 includes the original input code 101 (e.g., FORTRAN program code), as modified by the addition of communications-synchronization primitives and the mapping of global index variables to local index variables. This is thus a parallelized version of input code 101, which is then compiled and linked by compiler/linker 130 using machine-dependent parallel-processor run-time system library 132, and output as object code 139 for a particular parallel processor 140 (see FIG. 1). Block former 122 generates a block representation of the control flow determined by the specified index variables associated with the spatial coordinates, a much simpler task than would be the case if all control structures needed to be "blocked." Communications determiner 123 determines communications needed between processors. Communications collapser 124 determines a mapping that minimizes the interprocessor communications requirements. Loop splitter 125 splits loops that otherwise would have embedded communications within a loop structure. General parallel code converter 126 performs a global-to-local conversion of index variables. Graphical user interface (GUI) 127 provides a graphical user interface display of various functions including call-tree handler 321, block viewer 322, and stencil viewer 323. Call-tree handler 321 determines and provides output representing subroutine call trees. Block viewer 322 determines and provides output representing blocks of code and the control flow between such. Stencil viewer 323 determines and provides output representing communications between processors.

One embodiment of the present invention, parallelization agent 150, has been developed to facilitate parallelization of legacy codes. By creating powerful abstractions (explained further below) for important classes of scientific and engineering codes, and by developing a structured parallelization method based on these abstractions, the parallelization agent 150 provides new ways to solve certain otherwise-intractable problems.

Figure 4:
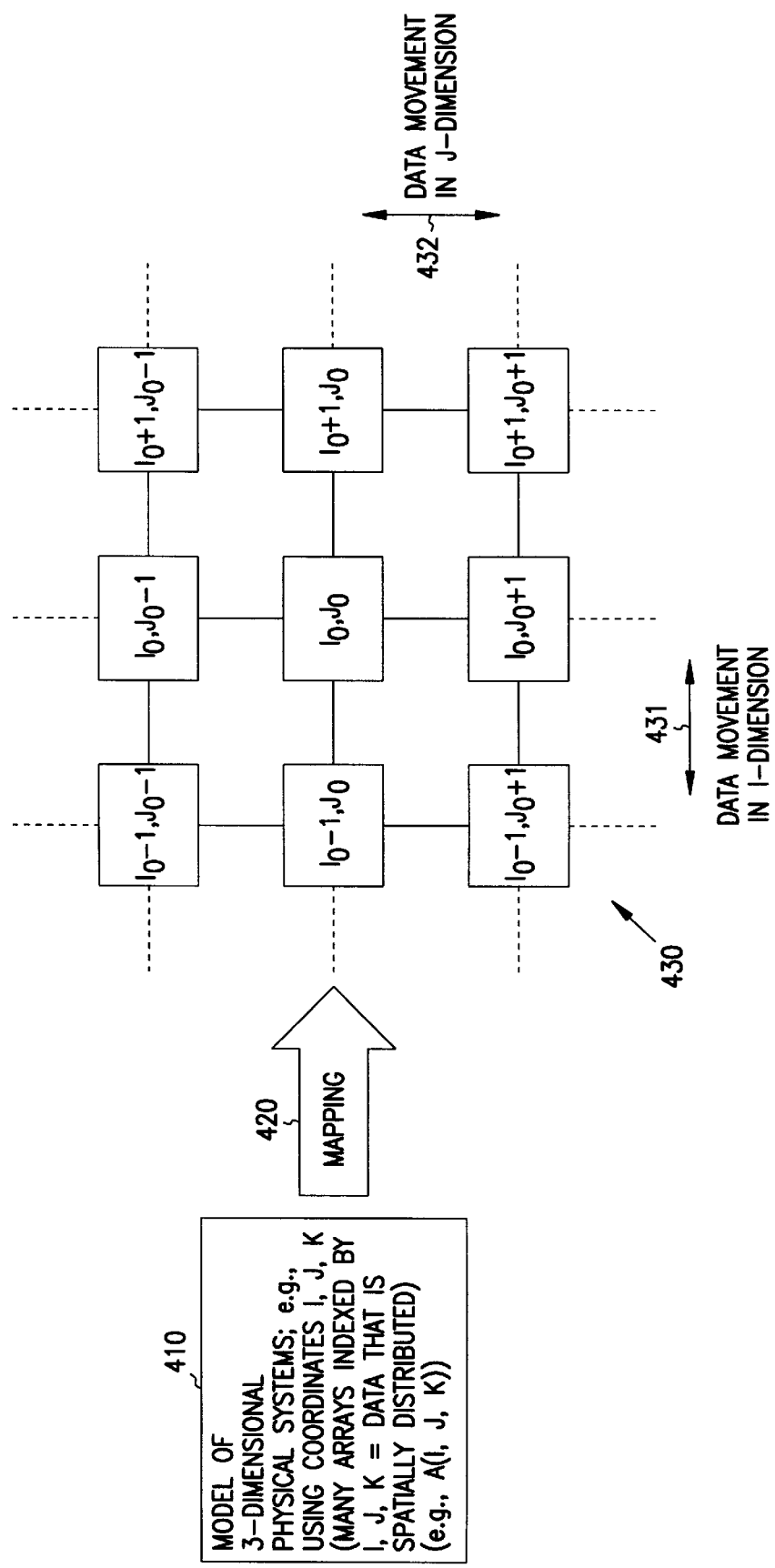
FIG. 4 is a diagram illustrating the mapping of a legacy-code program having a 3D model of a physical system onto a 2D parallel-processor array.

FIG. 4 is a diagram illustrating the mapping of a legacy-code program having a 3D model of a physical system onto a 2D parallel-processor array. One embodiment of the present invention involves mapping a legacy-code program 410 that includes a model of a physical system onto a parallel processor 430 using a suitable mapping 420. In general, such a mapping involves "collapsing" one of the dimensions of all arrays that hold certain spatially distributed data such that data for that one dimension remains within a processor, while data in other dimensions is distributed among the processors. The number of dimensions is then reduced by one, e.g., a model having 3D arrays will be mapped to a two-dimensional (2D) parallel processor array. 3D legacy codes 410 get mapped to 2D processor arrays 430. (2D legacy codes 410 get mapped to 1D processor arrays 430, and 4D models 410 get mapped to 3D processor arrays 430.) For example, if program 410 uses a coordinate system having index variables I, J, and K, it will generally have many array variables indexed by those coordinates, e.g., A(I,J,K), B(I,J,K), etc. If it is known that the class of program has characteristic data movement between variables, then it is advantageous to choose a mapping 420 that minimizes the amount of data communicated between processors and the distance that data must travel. For example, FDM codes such as used in weather models have regular and limited data communications needs in the horizontal plane, but more complex and irregular data communications needs in the vertical direction. Thus it is advantageous when parallelizing such code to keep data that in the model is spatially distributed in the vertical direction (e.g., data indexed by index variable K) mapped so that those data are not distributed to different processors in parallel processor 430, and thus those data remain within the processor they start in. On the other hand, data that is spatially distributed (e.g., data indexed by index variables I and J) will be mapped by mapping 420 such that the data of the I-indexed dimension is spread in direction 431 (side-to-side relative to FIG. 4) in the parallel-processor array and the data of the J-indexed dimension is spread in direction 432 (up-down) in the parallel-processor array. The parallel processor array is configured to communicate array data in only two dimensions in this example. One characteristic of FDM codes when mapped properly is that the interprocessor data communications needed from a particular processor (e.g., from the $I_0$, $J_0$ processor) is only to its eight nearest neighbors (e.g., processors labeled $I_0-1$, $J_0-1$; $I_0-1$, $J_0$; $I_0-1$, $J_0+1$; $I_0$, $J_0-1$; $I_0$, $J_0+1$; $I_0+1$, $J_0-1$; $I_0+1$, $J_0-1$; $I_0+1$, $J_0$; $I_0+1$, $J_0+1$—these processors are called the first-level neighborhood) and the nearest neighbors (called the second-level neighborhood) of those processors (i.e., I and J data when it is moved, gets moved plus or minus one or two processors in either or both directions). In order to take advantage of the parallel processors, the data must be distributed among the processors, but a mapping must then be chosen that minimizes the amount of data and the distance it is moved.

Figure 5:
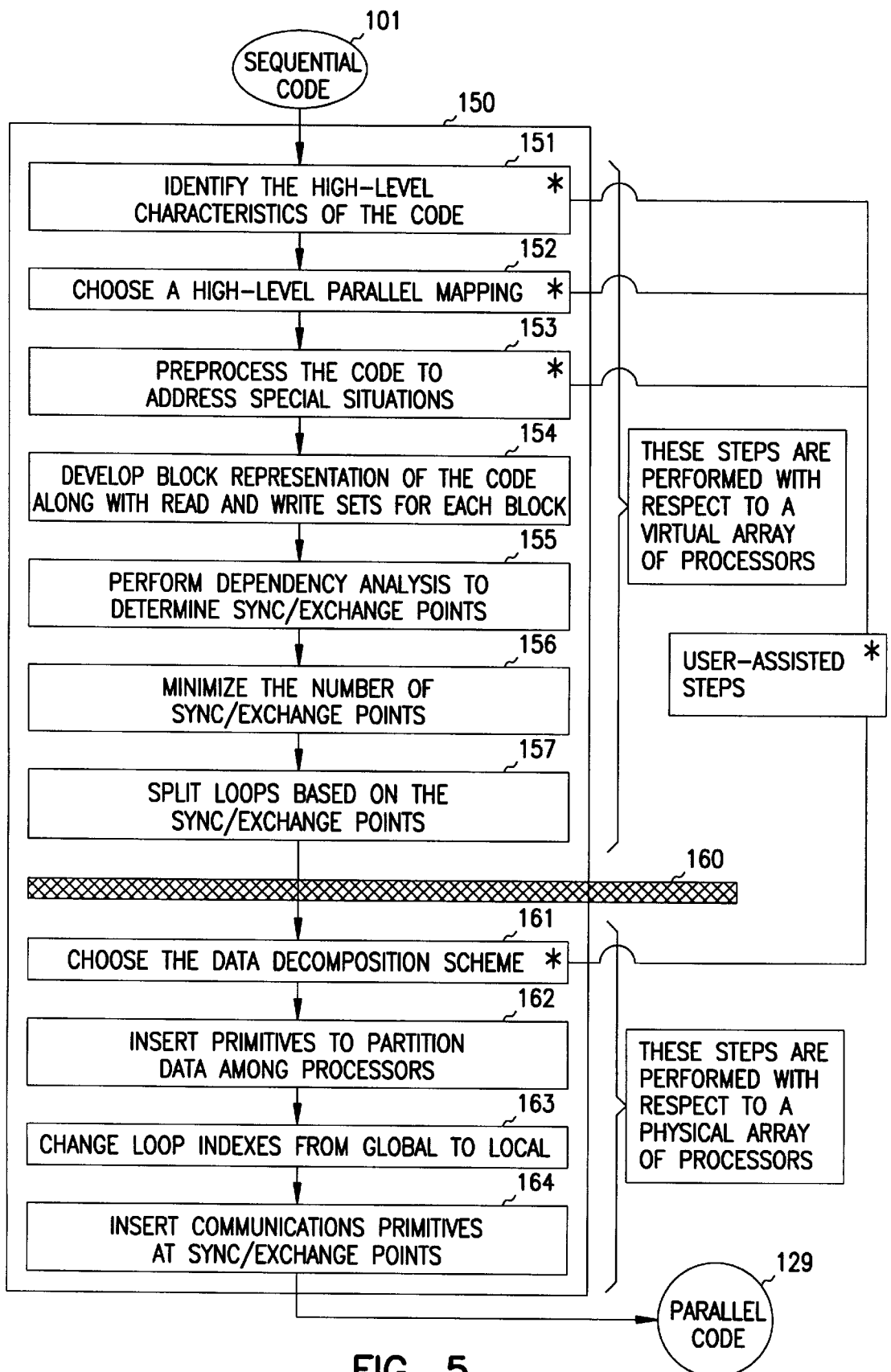
FIG. 5 is a flowchart illustrating one embodiment of parallelization agent 150.

FIG. 5 is a flowchart illustrating one embodiment of parallelization agent 150. In this embodiment, legacy code 101 (designed for a sequential computer system) is input to PA 150 (in one embodiment, upon prompting from the system, the user specifies a class, and selects a file name of one of the files to be processed). (Note that a "sequential" computer system may be implemented as a uniprocessor, or as a multiprocessor designed to accommodate multiple users and perhaps having different special-purpose processors that handle e.g., computations versus input/output operations. In contrast, a "parallel processor" computer system as used here denotes a multiple-processor system wherein computational problems are distributed among two or more processors for parallel execution.) At step 151, the system prompts for and receives from the user information identifying to PA 150 the names of the index variables used for spatial arrays for the class (e.g., for a 3D FDM-type code, if the legacy-code program 101 used index variables I, J, and K to index into spatial arrays for the FDM code, the user then specifies I, J, and K to PA 150 at this step). At step 152, the system prompts for and receives from the user information identifying to PA 150 the names of the index variables used to parallelize (e.g., for the exemplary 3D FDM-type code, if the user decided to parallelize along I and J (spreading data indexed by I and J to different processors while keeping data indexed by K in the same processors), the user then specifies I and J to PA 150 at this step). At step 153, the system prompts for and receives from the user information to resolve ambiguities for PA 150 (e.g., for the exemplary 3D FDM-type code, if the legacy-code program 101 used index variables I, J. and K to index into spatial arrays, and includes statements such as A(M,N)=X or B(1, 5,K)=Y and these arrays were used elsewhere for spatial array data, the user would determine manually that, for example M corresponded to J, N corresponded to K and then provide this information to the PA 150). At step 154, PA 150 automatically generates a block representation of the control flow of the program 101 (i.e., for each control structure, e.g., each DO-loop and IF-THEN structure) that involves one or more of the specified spatial index variables (e.g., I, J, or K in the above examples), and also determines READ sets and WRITE sets for each of these blocks. Step 154 thus creates many fewer blocks than the similar step performed by a general-purpose compiler, since only blocks associated with the spatial-index variables are developed by this step (e.g., only DO-loops involving I, J, and/or K are blocked, all other DO-loops are ignored). At step 155, PA 150 performs a dependency analysis to automatically, i.e., without user assistance, determine communications-synchronization and data-exchange ("sync/exchange") points (these are points where data is to be passed from one processor to another, and so a synchronization primitive is inserted to indicate between the affected processors when the data is ready to be passed). Note that steps 151 through 157 are performed with respect to a virtual array of processors. At step 156, PA 150 performs an operation to automatically minimize the number of sync/exchange points. At step 157, PA 150 performs an operation to automatically split loops based on the determined sync/exchange points (i.e., for communications points that are within DO-loops or similar repeating structures, the loop is split into the portion before the communications point, a grouped communication, and the loop portion after the communications point. In this way, the communication overhead is reduced by having one large communication operation with one overhead rather than many small communication operations each having its own overhead).

The line at 160 may be thought of as the conversion from the virtual array of parallel processors, unconstrained as to size or shape, into a physical (or real) array of processors constrained as to size and shape by the available parallel processor (PP) 140. Factors possibly affecting the size and shape of parallel processor 140 include cost, speed, and interconnection constraints. Steps 161 through 164 are performed with respect to the physical array of processors in PP 140. At step 161, the user specifies a data decomposition scheme (generally either a block scheme, a scatter scheme, or a hybrid scheme) to PA 150 to be used to distribute the spatial array data among the processors of PP 140. At step 162, PA 150 performs an operation to automatically insert primitives to partition data among the processors of PP 140. At step 163, PA 150 performs an operation to automatically change loop variables from global to local based on the mapping from virtual to physical processor array. At step 164, PA 150 performs an operation to automatically insert communications primitives at sync/exchange points. After this operation, parallel code 129 is output.

In one embodiment, PA 150 is able to handle a plurality of classes of code, and in this embodiment, step 151 also involves prompting the user to specify one of these classes. Information specific to one class is used in the variable selection of step 151, as well as the operations of steps 152 through 161. As noted above, and in this embodiment, user interaction is required for steps 151, 152, 153, and 161. In one such embodiment, the user is also required to ensure the initial code 101 is in a canonical form in order that the PA 150 properly interprets and handles the code.

For FDM-class codes, the user specifies, for example, that arrays indexed by I, J, K will be mapped to the parallel processor 140 such that I and J specify a location of a processor in order to minimize interprocessor data communication. For other classes of codes, for example, if a mapping that distributed array data such that I+J and J−K specified a location of a processor in order to minimize interprocessor data communication, a linear algebra algorithm might be used in order to find the optimal mapping of array data to processor location. In other embodiments, a place-and-step algorithm analogous to algorithms used for integrated-chip layout are used to map array data placement. {S. C. Kothari, Ethan Gannett, Hee-Kuck Oh, *Optimal Design of systolic Architecture*, Proceedings of 1989 International Conference on Parallel and Distributed Processing, pp 247–256, 1989.}

The user 99 thus specifies (in input 102, FIG. 1) the class of code, and thus the particular mapping for that class. Thus, for an FDM class of code, a mapping that distributes array data among processors for those dimensions for which data gets moved to nearest-neighbor processors. In such an example, user 99 also specifies (in input 102, FIG. 1) which index variables specify data that is to be spread among the processors (e.g., indexes I and J), and which index variable is to be kept and processed internally within processors (e.g., the K index). Diagnosis and preprocessing program 110 then uses this user input to analyze the legacy code files 101, and for each, provide output for the user that indicates where in the code it needs further information (i.e., in one embodiment, a printout is provided that shows the user each line number in question and the variable for which the program 110 needs further information). For example, the following statements would be expected of the FDM class and be automatically handled by preprocessing program 110:

| | |
|---|---|
| A(I,J,K) = X; | /* loading a constant into array A */ |
| B(I,J,K) = A(I,J,K) + 1; | /* loading array A plus a constant into array B */ |
| C(I,J,K) = A(I+1,J,K); | /* array A, moving ± 1 in the I dimension*/ |
| D(I,J,K) =; A(I−1, J−1, K+5); | /* array A, moving ± 1 in I, J; and number in K*/ |
| E(I,J) = A(I,J,1); | /* slice of array A at K=1 loaded into a 2D array*/ |

Each of the above statements (even if presented without the comments) unambiguously specifies index variables, array variables, and keeps data movements within the rules established for the FDM class. Note that the order in which index variables are presented in the array variable is not necessarily or typically this regular.

In contrast, the following statement provides ambiguous specification of the index variable, and would be called out to the user who would be required to provide the additional information needed for the preprocessing program 110 to complete its analysis:

| | |
|---|---|
| A(1,5,K) = X; | /*does 1 or 5 represent the I index variable? J?*/ |
| G(1,5) = A(I,J,K); | /*does 1 or 5 represent the I, J or K index variable?*/ |

The user 99 is then required to analyze legacy code 101 themselves and from that analysis, to provide user input 104 that specifies a resolution, i.e., the correct mapping from each ambiguous index to the proper index variable. In one embodiment, when the program 110 finds and asks about, e.g., the ambiguous "G(1,5)" in a system using I, J, and K as index variables for the spatially distributed coordinate system, the user provides the response "1 0 2" to indicate that the 1 is associated with the I index variable (I=1), J is not used, and 5 is associated with the K index variable (K=5).

Output 103 also includes an indication of all variable uses which do not match the program's knowledge of the class (for example, if the user has specified FDM class codes, and I and J as the index variables for nearest-neighbor communications, then the program 110 would alert the user to questionable assignments such as

B(I,J,K)=A(I+5, J, K);

since such statements would cause the movement of data 5 processors in the I-coordinate direction, well outside the expected nearest-neighbor range of data communications for FDM-class codes. The user, seeing such an anomaly, could then either correct the problem (perhaps either an error in the original code, an error in the identification of the class, or an error in the identification of variable mapping.

One embodiment of the present invention provides a prototype tool for parallelizing a subclass of finite-difference (FDM) codes. The prototype tool has been applied to parallelize the Penn State/NCAR (National Center for Atmospheric Research) MM5 program, the fifth-generation Mesoscale Meteorology model.

A large number of scientific and engineering studies are based on numerical modeling of physical phenomena. Over the years, software for many numerical models have evolved to a high level of sophistication. Scientists have invested enormous time and effort in developing such codes and typically such codes evolve over the years and go through many refinement phases to make them robust and comprehensive for the study of a particular phenomenon. The solid pedigree associated with such codes make them very valuable.

There are, however, major hurdles in application of parallel computing to these legacy codes. The magnitude of effort required for manual parallelization is prohibitively large. Not only is it time consuming to manually parallelize (transform from sequential program to parallel program) these codes, but the manual approach is also prone to errors, and debugging some of those errors can be very difficult.

A new approach to automatic parallelization has been developed into the present invention. This approach has two main distinguishing features. First, as opposed to parallelization of an arbitrary code, the present invention focuses on parallelization of key classes of numerical models, for example, the finite-difference method (FDM), the finite-element method (FEM), and the boundary-element method (BEM). FDM codes tend to be able to use a simple mapping because of nearest-neighbor communications between cells in certain dimensions. BEM codes are more complex, since every cell interacts with every other cell. FEM codes tend to have some irregularity and different mappings are appropriate for various portions of the program. The size and shape of neighborhoods change, for example, in an FEM analysis of a gear, the neighborhoods are different for sharp corners versus smooth areas of the gear.

In particular, if a computer program includes, for example, an FDM algorithm in a portion of the program, that portion is parallelized by PA 150, while the rest of the program is left as is (in fact, in one embodiment, those portions are temporarily commented out so that the PA 150 will ignore those portions which could otherwise slow PA 150 or confuse it during its processing—the user then later can manually place whatever changes may be appropriate to handle that code), in order to ensure correct operation. Second, the automatic analysis and the transformations of the sequential code used to arrive at the parallel code are based on high-level knowledge of the numerical method.

The key benefits of the new approach are: (a.) substantial reuse of existing software for engineering and scientific applications, and (b.) considerable saving of time and effort for developing efficient parallel code. In one embodiment, a prototype for a parallelizing a subclass of finite-difference codes has been developed, and its use has been demonstrated by parallelizing the main routine from the MM5 program, the fifth-generation Mesoscale Meteorology model {R. A. Anthes and T. T. Warner, *Development of hydrodynamic models suitable for air pollution and other mesometeorological studies*, Mon. Weather Review, 106 (1978), pp. 1045–1078}. This prototype tool has also been used by a single user wherein the time for parallelizing the entire MM5 program was completed in about a couple of weeks, as compared to an estimated time of a couple of years using conventional conversion methods. In fact, the automatic processing performed by automatic parallelization stage 120 took approximately five minutes.

Approach

Several aspects of the parallelization problem are known to be NP-complete (non-polynomial time) {J. Li and M. Chen, *The data alignment phase in compiling programs for distributed memory machines*, Journal of Parallel and Distributed Computing, 13 (1991), pp. 213–221}. The complex semantics of numerical models resulting from interactions of the physics of the problem, the mathematical model, and the numerical technique for solving the problem, add to the difficulties of parallelization. The research on automatic parallelization is predominantly focused on parallelization of arbitrary sequential programs. At that level of generality, the parallelization problem is very difficult. Existing tools mainly depend on information gathered from syntactic analysis of programs, and lack an effective way of dealing with the complex semantics of numerical models. Such approaches provide speedups in the placement or distribution of data among processors, and may be analogized to providing to a delivery person a faster car when the problem is to search for a large number of particular places one wants to go within one of many cities.

The approach of the present invention shifts the focus of parallelization of codes to having specific classes of problems based on numerical methods for modeling a broad range of physical phenomena. A large number of scientific and engineering codes are primarily based on three numerical methods: finite-difference method (FDM), finite-element method (FEM), and boundary-element method (BEM). A broad spectrum of scientific and engineering applications benefit from automatic parallelization tools that can handle these three classes. The present invention includes providing a predetermined map that has been determined to be efficient and correct for the class the map is designed for, and may be analogized to providing to the delivery person a map for each city which can be repeated used to efficiently find the places within each city for which a map has been designed.

The advantage of focusing on a class of problems is that the high-level knowledge of each specific class can be used to simplify the otherwise intractable problem of parallelization. For each class, there is a specific knowledge (in one embodiment, this knowledge is embodied in templates, described more fully below) that is all that is needed to handle programs of that class. Historically, a shift in focus also occurred in the domain of artificial intelligence when expert systems were introduced. While the problem of developing an intelligent program is too difficult in general, the idea of expert systems has proved to be fruitful in addressing certain important problems of special interest.

Complete automation in parallelization of complex codes is extremely difficult, if not impossible. An example of a step very difficult to automate is recognition of the algorithmic form (because of the large variety of ways that an algorithm can be programmed). A programmer performing manual parallelization, for instance, would first find out that the program uses finite-difference code (FDM) and then proceed with the parallelization. This crucial step presents a type of pattern-recognition problem that is beyond what can be automated with existing technology. The user, however, can readily assist a parallelization tool by providing this step of identifying the form of the algorithm.

Rather than striving for complete automation, the approach of the present invention automates those tasks which are tedious, error prone, and time consuming for the user (e.g., tracking the use of array variables and index variables within a large number of program files, each file having a large number of statements and subroutine calls). Note that while automation may not be needed to recognize the algorithmic form, it is still very effective and needed for other tedious tasks such as insertion of data decomposition primitives for variables (often hundreds of variables are involved and must be tracked), identification of synchronization points, and insertion of communication primitives.

Various studies, some related to parallel programming and others related to software engineering environments, have explored the use of high-level knowledge in development of software. The Proteus system {A. Goldberg, P. Mills, L. Nyland, J. Prins, J. Reif, and J. Riely, *Specification and development of parallel algorithms with the proteus system*, DIMACS, 18 (1994), pp. 383, 399} uses a knowledge-based program development tool to translate subsets of Proteus language constructs. Starting with an initial high-level specification, Proteus programs are developed through program transformations which incrementally incorporate architectural details of a parallel machine. The Linda Program Builder {Ahmed, N. Carriero and D. Gelemter, *The linda program builder*, in Third Workshop Languages and Compilers for Parallelism, MIT Press, 1991}, supports templates which serve as a blueprint for program construction. The programming environments such as Dims {R. D. Williams, Dims: *A programming environment for unstructured triangular meshes on a distributed memory parallel processor*, in The third conference on hypercube concurrent computers and applications, vol. 2, 1988, pp. 1770–1787}, and the mesh-computation environment {Massingill, *Mes computations*, tech. rep., CalTech Technical Report, 1995} use a parallel-program archetype to develop parallel applications with common computation/communication structures by providing methods and code libraries specific to that structure. However, such systems and programming environments do not provide a framework for parallelization of existing code.

Formal frameworks exist for parallelizing compilers and interactive parallelization tools such as Forge and others {R. Friedman, J. Levesque, and G. Wagenbreth, *Fortran Parallelization Handbook*, Applied Parallel Research, 1995; S.

Hiranandani, K. Kennedy, C.-W. Tseng, and S. Warren, The d editor: *A new interactive parallel programming tool*, in Proceedings of Supercomputing Conference, 1994, pp. 733–742; J. M. Anderson and M. S. Lam, *Global optimizations for parallelism and locality on scalable parallel machines*, ACM SIGPLAN Notices, 28 (1993), pp. 112–125; Gannon, F. Bodin, S. Srinivas, N. Sundaresan, and S. Narayan, Sage++, *an object oriented tool kit for program transformations*, tech. rep., Dept. of Computer Science, Indiana University, 1993}. While some of the ideas from existing frameworks can be used, a new framework had to be developed because the approach of the present invention is different. One fundamental difference is that in the present approach, the parallelization process is driven by class-specific knowledge.

One basic premise of the present invention is that each one of the classes has its own high-level characteristics (e.g., what computational operations are to be atomic (i.e., operations completed within one processor and not distributed across processors), what are the computational-set rules, what are the variable access patterns, and what are the dependency rules) that can be used in the parallelization process. An abstract representation of each class and a new paradigm for mapping computations to processors form the core of the new approach of the present invention.

Abstract Representations (Class Templates)

An abstract representation (i.e., a set of templates) of each class captures those computational characteristics that play an important role in designing a parallel algorithm. The following simple example may help to give a concrete idea of abstract representations. The abstract representation defining a class of algorithms that can be parallelized in the same way as for matrix multiplication of the form C=A×B is defined as follows:

Atomic Computation: comp(i,j,k)

Computation Set: S={comp(i,j,k)| $0 \leq i,j,k < N$}

Variable Access Pattern: Read-set={(i,k), (k,j)} and Write-set={(i,j)}

Dependency template: comp(i,j)←C(i,j) and A(i,k) and B(k,j)

The atomic computation is a definition of the computation that is to be performed within a single processor (i.e., not distributed among processors). For the example above, a typical computation is C(I,J)=C(I,J)+A(I,K)*B(K,J), and both the addition and the multiplication should thus be performed within the same single processor. The computation set here specifies limits on the index variables, i.e., that each is greater than or equal to zero, and less than N.

The variable access pattern, specified by the Read-set and Write-set, shows how the read and the write variables are accessed by the computation. Note that, unlike a FOR-loop construct, the abstract representation does not prescribe any fixed order for performing the computations.

The dependency template shows how various index variables are accessed, which controls ultimately the data communication pattern or trajectory.

As another example, the templates associated with FDM-class codes are as follows:

Atomic Computation: comp,(i,j,k) {may also include $comp_2(i,j,k)$, etc.}

Computation Set: $S = \{comp(i,j,k) \equiv 0 \leq i < N_1, 0 \leq j < N_2 0 \leq k < N_3\}$ Variable Access Pattern: Read-set={(i±Δ, j±Δ, k±Δ), (i±Δ, j±Δ), (i±Δ, k±Δ), (j±Δ, k±Δ), (i±Δ), (j±Δ), (k±Δ) where Δ=0,1, or 2} and Write-set={(i,j,k), (i,j), (i,k), (j,k), (i), (j), (k)}

Dependency template: comp(i,j,k)←n variables of the form C(i±Δ, j±Δ, k±Δ) where Δ=0,1, or 2

A sequential program is a homogenized combination of what is to be done and how it is to be done {Skillicorn, *Architecture independent parallel computation, IEEE Computer*, 28 (1990), pp. 38–51}. The sequential expression of the "how" part introduces artificial dependencies {Banatre and D. L. Metayer, *The gamma model and its discipline of programming*, Science of Computer Programming, 15 (1990), pp. 55–70} and often reflects the underlying compiler technology and machine structure. The "how" part is irrelevant and distracting for uncovering the parallelism that could be exploited by parallel processors. The abstract representation is useful for focusing on what is the computation as opposed to how it is to be done.

For the purpose of parallelization, it is important to focus on the "what" part. The separation of "what" from "how" is usually very difficult without using high-level knowledge of the computation. The abstract representation embodies high-level knowledge necessary for disentanglement of sequential and parallel by identifying atomic sections of the code that can be embedded in a parallel program as the code to be executed sequentially at each individual processor. Typically, it is possible to reuse large sections of the sequential code in the parallel code. For example, the sections of code associated with physics calculations within an individual grid cell can often be directly embedded into a parallel program.

Another use of the abstract representation is to simplify dependency analysis. Identification of sections of the original sequential code as atomic segments hides many basic blocks inside a single atomic code segment, and thus simplifies the dependency analysis. In contrast, the commonly followed approach to dependency analysis, based on basic blocks defined by the control flow of the program, when applied to large production codes, results in a very large number of basic blocks and creates an explosion of information for analyzing dependencies.

Parallel Mapping

A paradigm for representing and analyzing parallel mappings has been developed. The representation is in terms of functions that map the computational space to the space formed by cross product of processor space and the time dimension for representing parallel time steps.

In a typical approach to data parallelism, for example in High-Performance FORTRAN WF), the data decomposition is specified and the owner-computers rule is used. Thus, the specification deals with distribution of computations among processors. It does not, however, explicitly capture the behavior of the parallel mapping along the time dimension. By including the time dimension in the representation one can capture the dynamics of a parallel mapping. Based on the dynamics, the trajectory of an array variable can be determined and hence its communication pattern can be deduced. The communications pattern is then used to control the flow of data between individual processors in the multiprocessor array.

In practice, the number of processors is typically much smaller than the number of computations to be done at each parallel step. To handle this situation, computations are grouped together and assigned to a single processor. One way to specify the grouping, as done in HPF, is to use data decomposition schemes such as block or scatter decomposition. An equivalent way to view the grouping of computations is the concept of processor virtualization where virtual processors are grouped together to correspond to one physical processor. The grouping scheme can then be represented by a function that maps virtual processors to physical processors. (See FIG. 5 description above.)

The representation of the grouping scheme along with the original representation of the parallel mapping abstractly defines the execution profile at each processor. Using this information, it is possible to develop an analytical method for describing the computational balance across the processors.

The single-processor, multiple-data (SPMD) mode of parallel computation is used, whose characteristics can be captured by the BSP (bulk synchronous processing) model {L. G. Valiant, *A bridging model for parallel computation*, Communications of ACM, 8 (1990), pp. 103–111} or a special case of Snyder's model {L. Snyder, *A practical parallel programming model*, DIMACS, 18 (1994), pp. 143–160}. Processors proceed together through a sequence of steps; although within a step, different processors may take different execution paths. Each step is followed by sync/exchange point. A request to fetch or store a remote data item can occur anywhere within a step but it is not guaranteed to be satisfied until the end of the step, when all processors are synchronized.

One embodiment of the present invention uses a method for generating efficient parallel mappings automatically. The method makes use of special characteristics present in a large number of numerical algorithms, including many commonly used matrix computations.

Usually, the number of valid parallel mappings (mappings leading to correct parallel algorithms) is very large which makes the search for efficient parallel algorithms a difficult problem. For instance, it can be shown that the number of valid mappings for matrix multiplication on a two-dimensional mesh of processors is bigger than $(n!)^P$ where P is the number of processors and the matrix size is n×n.

The search for efficient parallel mappings can be effectively constricted by using the approach of the present invention. The functional representation of a parallel mapping, by capturing the dynamics of the mapping, can determine the trajectories of array variables (i.e., how the data for such variables moves among the processors in the array) accessed in the computation. The ability to determine the trajectory can be used to constrict the space of parallel mappings in a way that leads to efficient parallel mappings. For example, one may allow only those parallel mappings whose functional representations lead to linear trajectories. Such trajectories will typically enforce nearest-neighbor communication which is a desirable property for generating efficient parallel algorithms.

It is desirable to minimize the amount of data that must be communicated between processors, to minimize the number of separate communications operations, and to minimize the distance (i.e., the number of processors across which the data travels from source to sink) such data must travel between the source processor and the destination processor. Generally, the amount of data communicated is minimized by binding certain variables so that data in local arrays stay within their "own" processor's local arrays (i.e., so they are not communicated between processors). The number of separate communications is minimized by splitting loops (e.g., a loop executed a thousand times that has a communication point in the middle is split into a first loop portion, a single grouped communications portion, and a second loop portion). This minimizes the overhead involved in establishing the communications needed (i.e., headers and other checking information that is added to each separate communication). Nearest-neighbor communications helps minimize distance.

The functional representation also provides another mechanism for generating efficient parallel mappings. This is by minimizing the span along the time dimension while keeping a fixed bound on the number of processors. Intuitively, the span is the number of steps in the parallel algorithm and the length of the critical path is the lower bound for the span.

The method for arriving at functional representations corresponding to efficient parallel mappings is based on linear algebra and diophantine analysis {see S. C. Kothari, Ethan Gannett, Hee-Kuck Oh, *Optimal Design of systolic Architecture*, Proceedings of 1989 International Conference on Parallel and Distributed Processing, pp 247–256, 1989.}. There are two important special characteristics, covering many numerical algorithms, which can be very effectively exploited by a mathematical method.

The first key characteristic is that the array-variable indexes and the do-loop indexes are affine functions of basic parameters defining the computational space.

The second key characteristic is that the computation space can be represented by a convex set and in most cases the convex set has a very simple structure, such as a regular polyhedron.

The need for an automatic method to generate an efficient parallel mapping depends on the problem. There are cases where it may be best to let the user specify the parallel mapping. The user may have high-level knowledge of the problem domain to suggest an efficient parallel mapping and that knowledge may be difficult to replicate in an automated system. For example, in atmospheric models such as the MM5 program, the physics calculations generate maximum data exchanges in the vertical direction. Based on this knowledge, the user can specify the parallel mapping to be the projection of the 3-D computation grid along the vertical direction onto a 2-D processor array, in order that the data exchanges in the vertical direction remain within a single processor in the array, thus minimizing the interprocessor communication. This choice of the projection direction will lower the interprocessor communication.

For complex problems such as the MM5 program, once the user specifies the parallel mapping, the system's task is to validate the mapping through dependency analysis. The alternative used in other approaches is to use the dependency analysis to search for a parallel mapping. Thus, in both cases, dependency analysis is required, however the goals are different. In one case, the goal is to validate and, in the other case, the goal is to search for a parallel mapping. In the present case, the validation goal is much simpler than the search goal. Prime factorization is a good example that can be used to understand the difference in the level of difficulty. Validating a parallel mapping is like checking whether a given factorization of a number is correct and searching for a parallel mapping is like finding the prime factors. The latter problem is much harder.

Prototype

One embodiment of the present invention is a prototype (called PA-106) that has been developed to parallelize a subset of finite-difference codes. The prototype uses class-specific knowledge in several of its steps including preprocessing of the code, creating internal representation based on atomic segments of the code, and in the dependency analysis. The process blends automation and user assistance to provide a pragmatic solution for parallelization of specific classes of codes.

The parallelization agent 150 does three things: (1) pre-processing of sequential code, (2) identifying sync/exchange points by reference tracing (use-def and def-use chains) of array variables and by using the high-level parallel mapping (3) transforming from sequential to parallel code. The last step includes insertion of data decomposition primitives, transformation from global to local loop indexes, and insertion of the communication primitives.

The prototype uses a graphical user interface (GUI) to support interaction with the user and provides the user with preprocessing and parallelization menus. PA-I96 supports inter-procedural analysis and the user can use these menus to start and abort processing of individual FORTRAN files. The system maintains information about the state of parallelization of individual files. The GUI is also used to enter high-level information about the code, and parallelization choices. Such choices include: high-level mapping, data-partitioning, and choice of target machine.

The starting point for the parallelization process is the specification of the algorithm class and high-level information to provide a binding between the code and the class. This specification is provided by the user. In one version of the prototype tool, the user identifies the class as the finite difference and provides the binding by specifying the spatial and temporal indexes used in the code. The end result of the parallelization process is a SPMD code for a distributed memory machine using mesh topology for communication. The communication is specified at a logical level, and the low-level details of communication, such as packaging of messages, are handled by a run-time system library (such as RSL 132).

The preprocessing of sequential code includes steps to check if the given code conforms to the abstract representation of the class identified by the user. The prototype tool implements a basic mechanism, but demonstrates how the system can automatically identify some of the quirks in the code that can create problems for efficient parallelization. These quirks often reflect ad hoc programming practice adopted in the sequential code to suit specific compiler technology or memory structure. The system parses the code and preprocesses it to identify the quirks in the code. The user assists the system in resolving the quirks.

Once the quirks in the code are fixed, the system goes through the parallelization process and produces the parallel code. In order to minimize the parallel execution time, load balance and communication are the main issues. Communication cost has three components: contention, latency and volume. Contention depends on the data access patterns; these are determined by the parallel mapping and the initial data layout. Latency and volume components can be reduced by collapsing the sync/exchange points. Typically, the latency is high because of the high message startup cost. Therefore, there is an advantage in collapsing the number of sync/exchange points and aggregating smaller messages into a single large message. A code may have hundreds of sync/exchange points. In practice, these can (and, for efficiency, must) be collapsed into a small number of sync/exchange points. One of the steps in the parallelization process is to collapse synchronization points together as much as possible.

PA-I96 provides a graphical display of key computational characteristics to help the user's understanding of complex codes and their parallelization. A block-level view of the entire code is provided and the communication between blocks is shown as stencils. The user can selectively activate parallelization of subroutines and observe the change in communication pattern. By observing these patterns, scientists can relate the code to their understanding of the physical phenomenon.

The Penn State/NCAR MM5 program, the fifth-generation Mesoscale meteorology model (R. A. Anthes and T. T. Warner, *Development of hydrodynamic models suitable for air pollution and other mesometeorological studies*, Mon. Weather Review, 106 (1978), pp. 1045–1078) represents almost two decades of development efforts. The MM5 program consists of more than 200 program files, several hundred variables, and about one hundred thousand lines of code. A team of scientists at the Argonne National Laboratory have spent over two years to parallelize a version of MM5 code.

The viability of PA-196 has been demonstrated by using it to parallelize solve1.f (a key routine of the MM5 program) and some other routines of MM5 which are called from solve1.f. solve1.f is the main driver for MM5, has about 1500 lines of codes, and makes many subroutine calls.

SUMMARY

The present invention provides a tool that facilitates parallelization of existing legacy codes. The approach focuses on special classes of codes as opposed to parallelization of an arbitrary code and uses high-level knowledge about the classes to perform the parallelization. A blend of automation and user assistance is used to provide a pragmatic solution for parallelization of specific classes of codes.

The PA-I96 is a prototype tool, based on the approach of the present invention, to parallelize a subclass of finite-difference codes. The prototype uses class-specific knowledge in several of its steps including preprocessing of the code, creating internal representation based on atomic segments of the code, and in the dependency analysis. The prototype uses a graphical user interface (GUI) to support interaction with the user. The viability of PA-I96 has been demonstrated by using it to parallelize solve1.f, a key routine of MM5.

Figure 6:
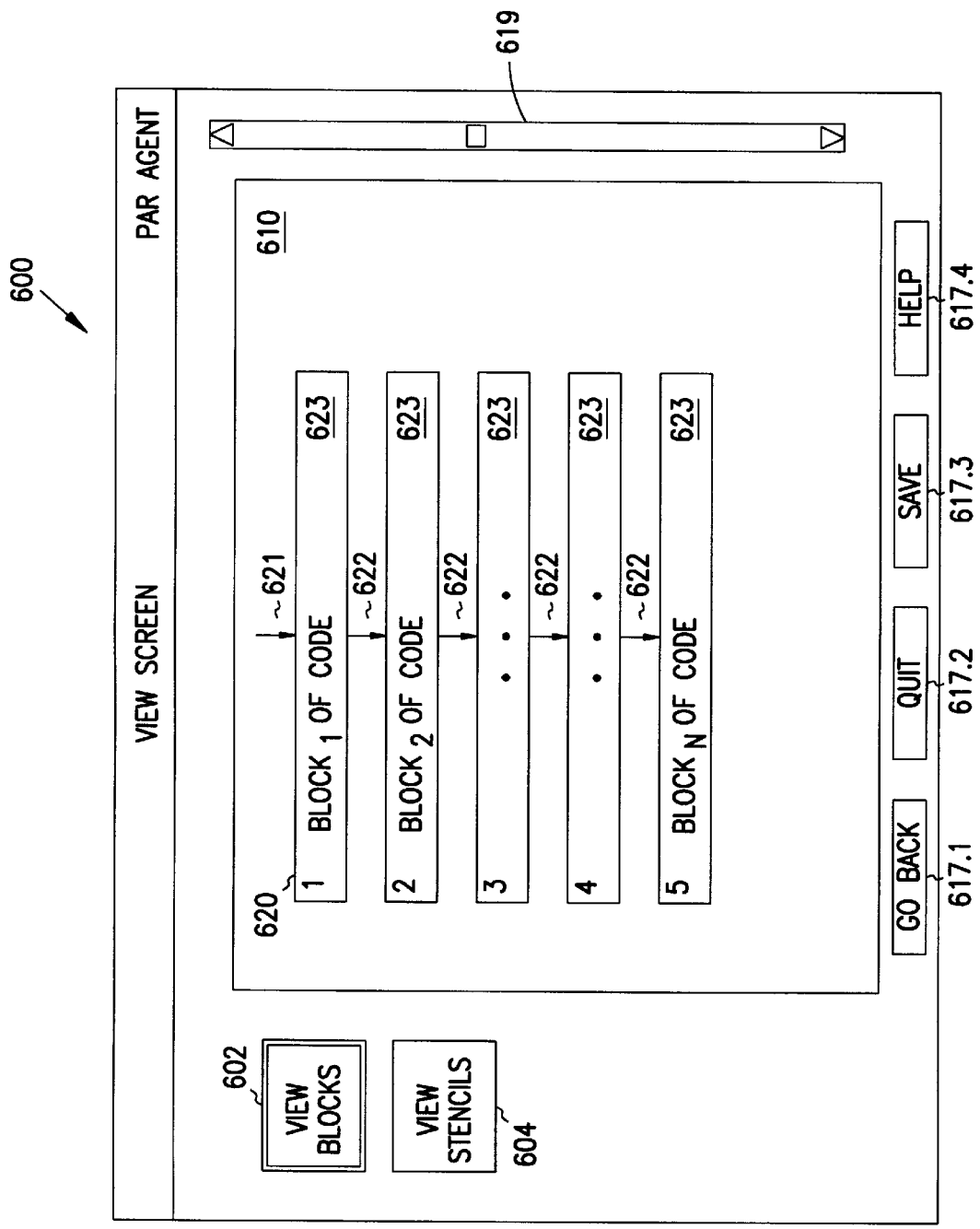
FIG. 6 is a screenshot of a block-flow diagram illustrating one embodiment of parallelization agent 150.
Figure 7:
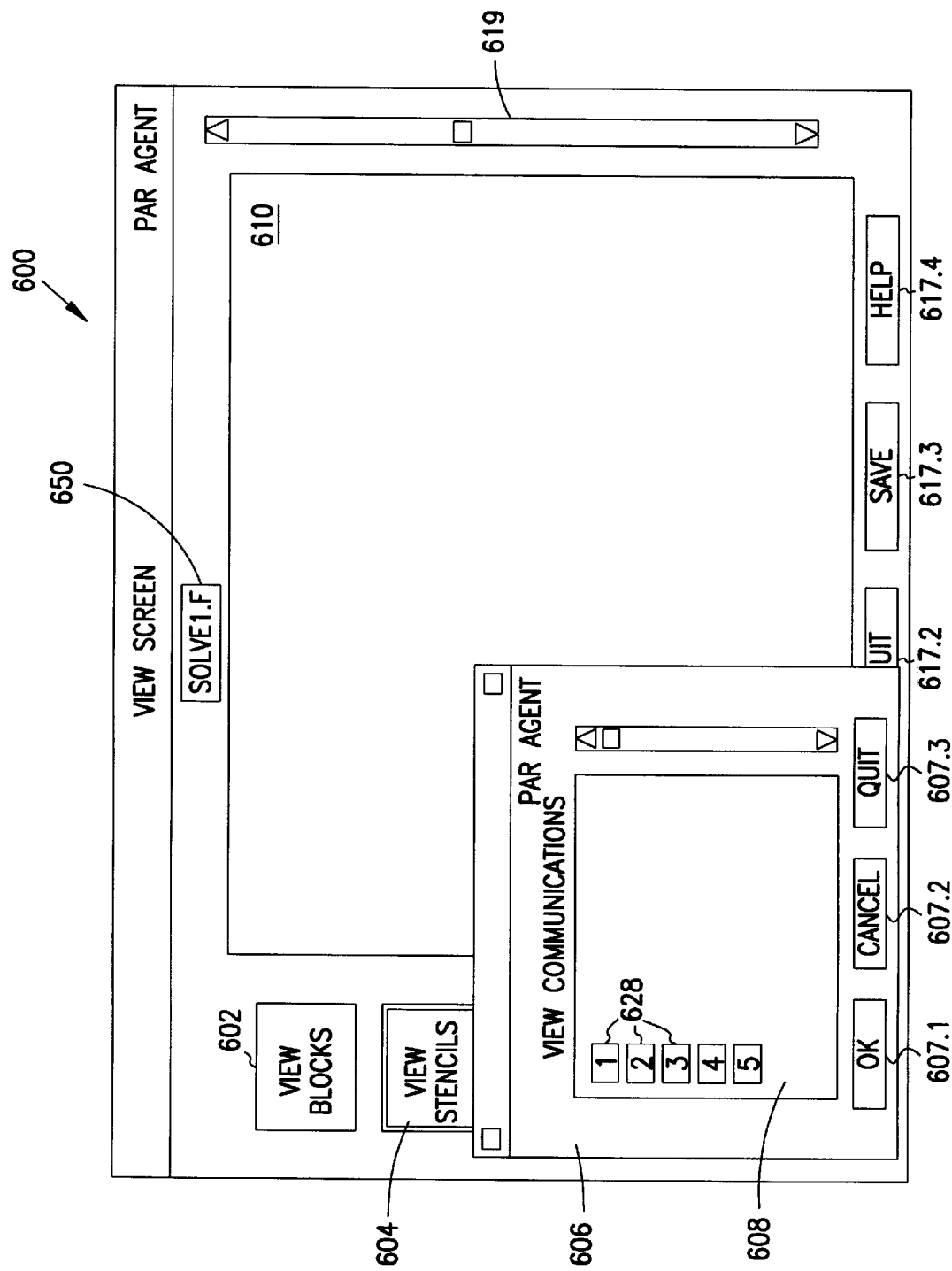
FIG. 7 is a screenshot of a view-communication control window illustrating one embodiment of parallelization agent 150.

FIG. 6 is a screenshot of a block-flow diagram illustrating the output of GUI 127 of one embodiment of parallelization agent 150. FIG. 7 is a screenshot of a view-communication control window illustrating the output of GUI 127 of one embodiment of parallelization agent 150. FIGS. 8.1 and 8.2 are screenshots of source-sink data-flow diagrams illustrating the output of GUI 127 of one embodiment of parallelization agent 150. These displays provide a logical view of solve1.f. This 1500-line key routine of MM5 is executed at every time step and it calls many other subroutines.

Display 1 (Block-level View of the Code of FIG. 6)

The parallelization agent 150 determines the sync/exchange points and groups the entire code into five blocks numbered 1 to 5. The screenshot of FIG. 6 shows display 600, control buttons 602, 604, 619, and 617.2–617.4. In addition, the code within each block can be viewed by clicking on a specific block. The "view blocks" control button 602 is shown with heavy outline to indicate this option is selected.

Display 2 (View Communication Screen of FIG. 7)

By clicking the stencils button 604 in Display 1, the View Communication screen appears (in this embodiment, as a windows overlaying a portion of the screen). Communication is needed initially (labeled 621) and also at the four sync/exchange points 622 between the code blocks 623. Communication at a specific sync/exchange point can be observed by clicking the corresponding number 628 for the View Communication screen 608 which then invokes the screens shown in FIGS. 8.1 and 8.2. Scroll button 819 on scroll bar 619 changes position to 819'.

Display 3 (Stencils to Show Communication of FIGS. 8.1 and 8.2)

By clicking on a button 628 e.g., on number 3 in Display 2 of FIG. 7, one can see the communication at the sync/exchange points between code blocks 3 and 4. In this case, there are six different communication patterns. For example, the third pattern shows that each cell receives from its north and south neighbors the variables: qca, gnia, gia, and gra, and the first pattern shows that each cell receives from its north, west, southwest and south neighbors the variables: ta and qva.

An interaction Based on the Logical View

The logical view provided by the parallelization agent 150 helps the scientist to deal with the complex code. For example, the scientist can selectively activate the subroutines called during solve1.f. By observing the communication patterns, scientists can relate the code to their understanding of the physical phenomena. This sample display was created by activating only a subset of the routines and when it was shown to a group of atmospheric scientists, they correctly guessed that the advection is not incorporated.

Parallelization Agent 150

Purpose. Automatic code conversion from sequential to parallel code for specific classes of codes.

Selected Classes. Parallelization of finite-difference (FDM) codes is the focus of one embodiment of the present invention. Other embodiments of the present invention address parallelization of boundary-element (BEM) codes and finite-element (FEM) codes.

Potential Application Areas. The system is useful for the automatic conversion of legacy codes from a wide spectrum of engineering and scientific problem domains such as weather forecasting, oil reservoir simulation, engineering design and analysis.

Overview of the system

This system represents a new approach to parallelization by combining two distinct technologies: the compiler technology and the expert system technology. This combination provides a simple but powerful approach to solving the problem of automatic parallelization for a broad spectrum of scientific and engineering codes. A high-level schematic view of the parallelization agent 150 system is shown in FIG. 1.

Key Idea

The system is targeted at specific classes of codes. The class-specific knowledge is summarized into an abstraction (or set of templates) that serves as a "map" for the structured parallelization method. The "map" simplifies the analysis necessary to make the important decisions for achieving efficient parallelization. The difficult part is making the decisions. Once the decisions are made, they are implemented using the compiler technology and a communication library.

Operational Characteristics

1. The user identifies the class of the code and provides some auxiliary information specific to the sequential code. This can usually be done in a couple of minutes. The system provides a menu-driven interface to guide the user during this phase.
2. The system checks if the given code is consistent with its "knowledge" of the particular class which the user has identified. The legacy codes often have many quirks which create a hindrance for efficient parallelization. As a result, the sequential code has to be cleaned before it can be effectively parallelized. The system provides a list of "problem situations" to the user. often, help is needed from a code expert to resolve these problems. The code expert can suggest some local modifications of the code to resolve the problems. This interaction is similar to what expert parallel programmers go through in manual parallelization. The manual scanning of large codes is very labor intensive and can take months at a time. The parallelization agent 150 can process large codes very quickly by automating diagnostics necessary for identifying the problem situations.
3. The third phase is the automatic parallelization. The system automatically determines the communication requirements and produces the parallel code. In a large code with thousands of lines containing hundreds of variables, a manual determination of communication requirements is very time consuming and error prone. By automating this task, the parallelization agent 150 can not only save considerable amount of time but guarantee correctness.

Novel Aspects of the System

The parallelization system is new in terms of the concept, the input-output behavior of the system, the scheme for incorporating the class-specific knowledge into the system, and the mode of operation.

The important new idea is to focus on key classes of codes, incorporate the class-specific knowledge into the system, and use that knowledge to solve the parallelization problem. The existing systems for automatic parallelization try to solve the problem without any high-level knowledge about the code which is like finding an unknown place in a big city without a street map. By incorporating a mechanism to use high-level knowledge about important classes of codes, a simple but a very powerful approach has been introduces to solve an otherwise intractable problem.

The input-output behavior of this system is quite different from existing systems for automatic parallelization. Unlike other systems, the parallelization agent 150 requires the user to identify the class of the code and provide some auxiliary information about the code. The determination of what goes into the auxiliary information and the creation of a template for representing the information is a part of the novelty of the system. The parallelization agent 150 provides diagnostic output to inform the user about problematic situations in the serial code. This is again very unique to this system.

The central concept in the new approach is class-specific knowledge about a given class of codes. The system defines what this knowledge should be, how to represent it, and how to use it for automatic parallelization.

The system has a unique mode of operation which includes three distinct phases: (a) requiring the user to provide high-level information about the sequential code, (b) diagnostic phase for identifying problematic situations and communicating its perception of the problems to the user, (c) automatic parallelization.

Automatic parallelization of large codes used in scientific and engineering applications. The parallelization agent 150 is of value to application developers and hardware vendors of parallel supercomputers.

Unlike the existing tools for parallelization, agent is capable of handling large and complex codes from real-life applications such as weather-forecasting models.

In one embodiment, PA 150 further performs the step of handing input code 101 in which data arrays for several physical entities are packaged into a single very large array (e.g., perhaps to optimize that code for sequential systems having caches). In such a case, PA 150 elicits further information from the user, information about how the array is divided or mapped to physical entities, in order divide the array and to determine and handle communications patterns for the various physical entities. Dividing the very large array into smaller arrays avoids having to have a single communications pattern to handle the entire array.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for class-specific parallelizing of input computer-program code comprising the steps of:

identifying to the computer a numerical-method class used in the input code;

identifying to the computer one or more index variables in the input code are associated with spatial coordinates of the numerical-method-class;

generating in the computer synchronization points for the input code based on the numerical-method class and the index variables; and generating in the computer a global-to-local index variable mapping based on the numerical-method class and the index variables.

2. The method of claim 1, further comprising the step of:

generating in the computer a block-based representation of a control flow based on the index variables.

3. The method of claim 1, wherein the step of generating synchronization points further comprising the step of:

performing in the computer dependency analysis to determine the communication-synchronization points.

4. The method of claim 1, further comprising the step of:

minimizing in the computer the number of communication-synchronization points for data transmitted between processors.

5. The method of claim 1, further comprising the step of:

mapping in the computer a computational set to a virtual array of parallel processors.

6. The method of claim 1, further comprising the steps of:

mapping in the computer a computational set to a virtual array of parallel processors; and mapping in the computer the virtual array of parallel processors to a physical array of parallel processors.

7. The method of claim 1, further comprising the step of:

outputting a representation of communications flow between processors of data related to the index variables.

8. The method of claim 1, further comprising the steps of:

selectively turning off one or more subroutine calls related to the index variable; and outputting a representation of communications flow between processors of data related to the index variables.

9. The method of claim 1, further comprising the step of:

providing to the computer a computational-set template of allowed types of computations related to the index variables.

10. The method of claim 1, further comprising the step of:

providing to the computer a dependency template of allowed types of dependencies related to the index variables.

11. A computerized system for class-specific parallelizing of input computer-program code comprising:

a computer;

a receiver in the computer that receives input identifying to the computer a numerical-method class used in the input code;

a receiver in the computer that receives input identifying to the computer one or more index variables in the input code are associated with spatial coordinates of the numerical-method-class;

a synchronization-point generator in the computer that generates synchronization points for the input code based on the numerical-method class and the index variables; and a mapper in the computer that generates a global-to-local index variable mapping based on the numerical-method class and the index variables.

12. A computer-implemented method for class-specific parallelizing of input computer-program code comprising the steps of:

identifying to the computer a numerical-method class used in the input code;

identifying to the computer one or more index variables in the input code are associated with spatial coordinates of the numerical-method-class;

preprocessing the input code based on a class-specific abstraction (CSA) of the numerical-method class;

automatically generating, in the computer, communications-synchronization points for the input code based on the CSA; and automatically generating, in the computer, a global-to-local index variable mapping based on the CSA.

13. A computer-implemented method for presenting to a user information regarding a computer-program code comprising the steps of:

identifying to the computer a numerical-method class used in the input code;

identifying to the computer one or more index variables in the input code are associated with coordinates of the numerical-method-class;

generating in the computer synchronization points for the input code based on the numerical-method class and the index variables; and outputting from the computer a block-based representation of a control flow based on the index variables for presentation to the user.

14. The method of claim 13, wherein the step of generating synchronization points further comprising the step of:

performing in the computer dependency analysis to determine the communication-synchronization points.

15. The method of claim 13, further comprising the steps of:

mapping in the computer a parallel-processor-usable version of the computer-program code; and minimizing in the computer the number of communication-synchronization points for data transmitted between processors.

16. The method of claim 13, further comprising the step of:
mapping in the computer a computational set to a virtual array of parallel processors.

17. The method of claim 13, further comprising the steps of:
mapping the computer a computational set to a virtual array of parallel processors; and
mapping in the computer the virtual array of parallel processors to a physical array of parallel processors.

18. The method of claim 13, further comprising the step of:
outputting a representation of communications flow between parallel processors of data related to the index variables.

19. The method of claim 13, further comprising the steps of:
selectively turning off one or more subroutine calls related to the index variable; and
outputting a representation of communications flow between parallel processors of data related to the index variables.

20. The method of claim 13, further comprising the step of:
providing to the computer a computational-set template of allowed types of computations related to the index variables; and
analyzing in the computer the computer-program code based on the template.

21. The method of claim 13, further comprising the step of:
providing to the computer a dependency template of allowed types of dependencies related to the index variables.

22. A storage medium having a computer program stored thereon for causing a suitably programmed system to process input computer-program code by performing the method of claim 13 when such program is executed on the system.

23. A storage medium having a computer program stored thereon for causing a suitably programmed system to process input computer-program code by performing the method of claim 19 when such program is executed on the system.

24. A computerized system for class-specific processing of input computer-program code comprising:
a computer;
a first receiver in the computer that receives input identifying to the computer a numerical-method class used in the input code;
a second receiver in the computer that receives input identifying to the computer one or more index variables in the input code are associated with coordinates of the numerical-method-class;
a synchronization-point generator in the computer, operatively coupled to the first and second receivers, that generates synchronization points for the input code based on the numerical-method class and the index variables; and a mapper in the computer, operatively coupled to the first and second receivers, that generates a global-local index variable mapping based on the numerical-method class and the index variables.

25. The system of claim 24, wherein synchronization-point generator further comprises:
a dependency analyzer that determines the communication-synchronization points.

26. The system of claim 24, further comprising:
a mapper in the computer that converts the computer-program code into a parallel-processor-usable version of the computer-program code; and
a reducer in the computer that reduces the number of communication-synchronization points for data transmitted between processors.

27. The system of claim 24, further comprising:
an output device that displays for a user a representation of communications flow between parallel processors of data related to the index variables.

28. The system of claim 24, further comprising:
a selector that receives input from a user and based on that input, selectively turns off one or more subroutine calls related to the index variable; and
outputting a representation of communications flow between parallel processors of data related to the index variables.

29. The system of claim 24, further comprising:
an analyzer in the computer tat analyzes the computer-program code based on a computational-set template of allowed types of computations related to the index variables.

30. A computer-implemented method for class-specific processing of input computer-program code comprising the steps of:
identifying to the computer a numerical-method class used in the input code;
identifying to the computer one or more index variables in the input code are associated with coordinates of the numerical-method-class;
preprocessing the input code based on a class-specific abstraction (CSA) of the numerical-method class;
automatically generating, in the computer, communications-synchronization points for the input code based on the CSA; and
automatically generating, in the computer, a global-to-local index variable mapping based on the CSA.

31. A computer-implemented method for helping a human user understand computer-program input code comprising the steps of:
identifying to the computer one or more index variables in the input code are associated with spatial coordinates of a numerical-method class; and
generating in the computer synchronization points for the input code based on the index variables; and
outputting by the computer a block-based representation of a control flow based on the index variables and the synchronization points.

32. The method of claim 31, further comprising the step of:
performing, in the computer dependency analysis to determine the communication-synchronization points.

* * * * *

UNITED STATES PATENT AND TRADEMARK OFFICE
CERTIFICATE OF CORRECTION

PATENT NO. : 6,339,840 B1
DATED : January 15, 2002
INVENTOR(S) : Kothari et al.

It is certified that error appears in the above-identified patent and that said Letters Patent is hereby corrected as shown below:

<u>Column 4,</u>
Line 22, delete "A".

<u>Column 25,</u>
Line 10, after "mapping" insert -- in --.

<u>Column 26,</u>
Line 28, delete "tat" and insert -- that --, therefor.

Signed and Sealed this

Eighteenth Day of June, 2002

*Attest:*

JAMES E. ROGAN
*Attesting Officer*     Director of the United States Patent and Trademark Office